(12) United States Patent
Naguib et al.

(10) Patent No.: US 12,365,764 B2
(45) Date of Patent: Jul. 22, 2025

(54) FABRICATION OF HYDROPHOBIC, MECHANICALLY FLEXIBLE AND OPTICALLY TRANSPARENT POLYIMIDE AEROGELS

(71) Applicant: THE GOVERNING COUNCIL OF THE UNIVERSITY OF TORONTO, Toronto (CA)

(72) Inventors: Hani Naguib, Toronto (CA); Omid Aghababaei Tafreshi, Toronto (CA); Shahriar Ghaffari-Mosanenzadeh, North York (CA); Zia Saadatnia, North York (CA)

(73) Assignee: THE GOVERNING COUNCIL OF THE UNIVERSITY OF TORONTO, Toronto (CA)

(*) Notice: Subject to any disclaimer, the term of this patent is extended or adjusted under 35 U.S.C. 154(b) by 0 days.

(21) Appl. No.: 18/243,824

(22) Filed: Sep. 8, 2023

(65) Prior Publication Data
US 2025/0084214 A1 Mar. 13, 2025

(51) Int. Cl.
C08G 73/10 (2006.01)
C08J 3/24 (2006.01)

(52) U.S. Cl.
CPC ............ C08G 73/1032 (2013.01); C08J 3/24 (2013.01); *C08J 2379/08* (2013.01)

(58) Field of Classification Search
CPC ...................... C08G 73/10; C08G 73/1007; C08G 73/1035; C08G 73/1039; C08G 73/1042; C08G 73/1046; C08G 73/105; C08G 73/1053; C08G 73/1057; C08G 73/106; C08G 73/1075
See application file for complete search history.

(56) References Cited

U.S. PATENT DOCUMENTS

| | | | |
|---|---|---|---|
| 7,074,880 B2 | 7/2006 | Rhine et al. | |
| 10,800,883 B1 | 10/2020 | Vivod et al. | |
| 10,907,025 B1 | 2/2021 | Williams et al. | |
| 11,658,398 B1* | 5/2023 | Downey | H01Q 5/378 343/705 |
| 2014/0350134 A1* | 11/2014 | Rodman | C08J 9/28 521/64 |
| 2017/0355829 A1* | 12/2017 | Irvin | B01J 13/0091 |
| 2022/0363829 A1 | 11/2022 | Steiner, III et al. | |

FOREIGN PATENT DOCUMENTS

CN 111253614 * 11/2018 ............. C08J 9/28

OTHER PUBLICATIONS

M. A. B. Meador et al., "Polyimide aerogels with amide cross-links: a low cost alternative for mechanically strong polymer aerogels," ACS Appl. Mater. Interfaces, vol. 7, No. 2, pp. 1240-1249, 2015.
H. Guo et al., "Polyimide aerogels cross-linked through amine functionalized polyoligomeric silsesquioxane," ACS Appl. Mater. Interfaces, vol. 3, No. 2, pp. 546-552, 2011.
M. A. B. Meador et al., "Mechanically strong, flexible polyimide aerogels cross-linked with aromatic triamine," ACS Appl. Mater. Interfaces, vol. 4, No. 2, pp. 536-544, 2012.
H. Guo et al., "Tailoring properties of cross-linked polyimide aerogels for better moisture resistance, flexibility, and strength," ACS Appl. Mater. Interfaces, vol. 4, No. 10, pp. 5422-5429, 2012.
S. Ghaffari Mosanenzadeh, M. Alshrah, Z. Saadatnia, C. B. Park, and H. E. Naguib, "Double Dianhydride Backbone Polyimide Aerogels with Enhanced Thermal Insulation for High-Temperature Applications," Macromol. Mater. Eng., vol. 305, No. 4, pp. 1-12, 2020, doi: 10.1002/mame.201900777.
S. G. Mosanenzadeh, Z. Saadatnia, S. Karamikamkar, C. B. Park, and H. E. Naguib, "Polyimide aerogels with novel bimodal micro and nano porous structure assembly for airborne nano filtering applications," RSC Adv., vol. 10, No. 39, pp. 22909-22920, 2020, doi: 10.1039/dOra03907a.
M. A. B. Meador, M. Agnello, L. McCorkle, S. L. Vivod, and N. Wilmoth, "Moisture-resistant polyimide aerogels containing propylene oxide links in the backbone," ACS Appl. Mater. Interfaces, vol. 8, No. 42, pp. 29073-29079, 2016.
B. N. Nguyen, M. A. B. Meador, D. Scheiman, and L. McCorkle, "Polyimide aerogels using triisocyanate as cross-linker," ACS Appl. Mater. Interfaces, vol. 9, No. 32, pp. 27313-27321, 2017.
W. Rhine, J. Wang, and R. Begag, "Polyimide aerogels, carbon aerogels, and metal carbide aerogels and methods of making same." Google Patents, Jul. 11, 2006.
S. G. Mosanenzadeh, S. Karamikamkar, Z. Saadatnia, C. B. Park, and H. E. Naguib, "PPDA-PMDA polyimide aerogels with tailored nanostructure assembly for air filtering applications," Sep. Purif. Technol., vol. 250, p. 117279, 2020.
O. A. Tafreshi et al., "Novel, Flexible, and Transparent Thin Film Polyimide Aerogels with Enhanced Thermal Insulation and High Service Temperature," J. Mater. Chem. C, 2022.
W. Chen, H. Yu, Q. Li, Y. Liu, and J. Li, "Ultralight and highly flexible aerogels with long cellulose I nanofibers," Soft Matter, vol. 7, No. 21, pp. 10360-10368, 2011.
H. Guo, M. A. B. Meador, L. S. McCorkle, D. A. Scheiman, J. D. McCrone, and B. Wilkewitz, "Poly(maleic anhydride) cross-linked polyimide aerogels: synthesis and properties," RSC Adv., vol. 6, No. 31, pp. 26055-26065, 2016, doi: 10.1039/C6RA01013J.

(Continued)

*Primary Examiner* — Shane Fang
(74) *Attorney, Agent, or Firm* — HILL & SCHUMACHER

(57) ABSTRACT

The present disclosure provides a method of fabrication of physically crosslinked polyimide (PCPI) aerogels with significantly improved properties using no chemical cross-linker. The fabricated PCPI aerogels present high moisture resistance, hydrophobic behavior, ultralow density, ultrahigh porosity, excellent thermal stability, increased mechanical strength, and high mechanical flexibility. Also, samples have been successfully fabricated in a thin-film geometry with high mechanical flexibility and controlled thickness. Furthermore, some fabricated aerogel films present improved optical transparency of over 80%, which is the highest transparency reported so far for organic PI aerogels.

25 Claims, 18 Drawing Sheets

(56) References Cited

OTHER PUBLICATIONS

S. Wu, A. Du, S. Huang, W. Sun, Y. Xiang, and B. Zhou, "Solution-processable polyimide aerogels with high hydrophobicity," Mater. Lett., vol. 176, pp. 118-121, 2016.
S. Qiao, S. Kang, Z. Hu, J. Yu, Y. Wang, and J. Zhu, "Moisture-resistance, mechanical and thermal properties of polyimide aerogels," J. Porous Mater., vol. 27, No. 1, pp. 237-247, 2020.
H. Guo et al., "Flexible Polyimide Aerogels with Dodecane Links in the Backbone Structure," ACS Appl. Mater. Interfaces, vol. 12, No. 29, pp. 33288-33296, 2020.
J. P. de Oliveira, G. P. Bruni, S. L. M. El Halal, F. C. Bertoldi, A. R. G. Dias, and E. da Rosa Zavareze, "Cellulose nanocrystals from rice and oat husks and their application in aerogels for food packaging," Int. J. Biol. Macromol., vol. 124, pp. 175-184, 2019.
J.-H. Kim, H.-R. Kim, H.-H. Park, and S.-H. Hyun, "Aging effect of SiO2 xerogel film on its microstructure and dielectric properties, " Appl. Surf. Sci., vol. 169, pp. 452-456, 2001.
J.-K. Hong, H.-S. Yang, M.-H. Jo, H.-H. Park, and S.-Y. Choi, "Preparation and characterization of porous silica xerogel film for low dielectric application," Thin Solid Films, vol. 308, pp. 495-500, 1997.
C. Wang, W. Chen, C. Xu, X. Zhao, and J. Li, "Fluorinated polyimide/POSS hybrid polymers with high solubility and low dielectric constant," Chinese J. Polym. Sci., vol. 34, No. 11, pp. 1363-1372, 2016.
S. G. Mosanenzadeh, Z. Saadatnia, F. Shi, C. B. Park, and H. E. Naguib, "Structure to properties relations of BPDA and PMDA backbone hybrid diamine polyimide aerogels," Polymer (Guildf)., vol. 176, No. February, pp. 213-226, 2019, doi: 10.1016/j.polymer.2019.05.050.
P. Gupta, B. Singh, A. K. Agrawal, and P. K. Maji, "Low density and high strength nanofibrillated cellulose aerogel for thermal insulation application," Mater. Des., vol. 158, pp. 224-236, 2018.
C. Gong, J. Ni, C. Tian, and Z. Su, "Research in porous structure of cellulose aerogel made from cellulose nanofibrils," Int. J. Biol. Macromol., vol. 172, pp. 573-579, 2021.
H. Liu et al., "Enhanced thermal shrinkage behavior of phenolic-derived carbon aerogel-reinforced by HNTs with superior compressive strength performance," Ceram. Int., vol. 47, No. 5, pp. 6487-6495, 2021.
Z. Yang, H. Yu, X. Li, H. Ding, and H. Ji, "Hyperelastic and hydrophobic silica aerogels with enhanced compressive strength by using VTES/MTMS as precursors," J. Non. Cryst. Solids, vol. 525, p. 119677, 2019.
H. Yang, X. Kong, Y. Zhang, C. Wu, and E. Cao, "Mechanical properties of polymer-modified silica aerogels dried under ambient pressure," J. Non. Cryst. Solids, vol. 357, No. 19-20, pp. 3447-3453, 2011.
L. Zhao et al., "Theoretical and experimental investigation of haze in transparent aerogels," Opt. Express, vol. 27, No. 4, pp. A39-A50, 2019.

\* cited by examiner

FABRICATION OF HYDROPHOBIC, MECHANICALLY FLEXIBLE AND OPTICALLY TRANSPARENT POLYIMIDE AEROGELS

FIELD

The present disclosure relates to the synthesis of hydrophobic, mechanically flexible, and optically transparent physically crosslinked polyimide (PCPI) aerogels.

BACKGROUND

Aerogels are a class of materials made by removing the liquid part of a gel without damaging its solid network. With respect to their mesopore structure and high porosity of more than 80%, aerogels displayed unique properties; including but not limited to ultra-low thermal conductivity (as low as 4 mWm$^{-1}$K$^{-1}$), extremely low density, high porosity, high compressive strength as well as high surface area. Such properties suggest a high potential for aerogels to be used in a wide range of industrial applications, such as super thermal insulation, optics, acoustic insulation, airborne nanoparticles filtration, oil/organic solvents water separation, energy harvesting, energy storage devices, electromagnetic shielding, and even catalysts.

Aerogels can be made from an extensive range of materials, as long as they are able to form a gel. Among those, silica is the most studied one. Yet, high brittleness and hydrophobic nature significantly restricted their penetration into industrial applications. With respect to their higher potential to achieve enhanced ductility and high service temperature, organic polyimide (PI) aerogels have received more attention from scientists during the past decade. Conventionally, PI gels are fabricated by step-growth polymerization of at least a diamine and a dianhydride monomer followed by the crosslinking of the formed polymer chains using a chemical crosslinker [1]-[4]. Then, the formed gels are converted to aerogel using either supercritical or freeze-drying techniques. Based on this method, except for a couple of researches on controlling aerogel properties by tailoring its morphology [5], [6], the rest are focused on improving aerogels properties by modifying its backbone chemistry through either changing its monomers composition or altering its chemical crosslinker type.

In this context, H. Guo et al. used octa(aminophenyl) silses-quioxane (OAPS) chemical crosslinker with silsesquioxane cage structure consisting of a silicon and oxygen framework with eight aminophenyl groups to bond with different monomers including bisaniline-p-xylidene (BAX), 2,2'-Dimethylbenzidine (DMBZ), p-phenylenediamine (PPDA), and 4,4'-oxydianiline (ODA) diamine in reaction with 3,3',4,4'-biphenyltetracarboxylic dianhydride (BPDA) monomer [2], [4]. From the results, the OAPS crosslinked PI aerogels showed slightly lower shrinkage and density compared to previously reported 1,3,5-triaminophenoxybenzene (TAB) crosslinked aerogels with comparable backbone chemistry. Furthermore, OAPS crosslinked PI aerogels with at least 50% DMBZ mol. % in their backbone presented enhanced moisture resistance. However, the OAPS is not commercially available and is also a very expensive chemical crosslinker.

In contrast with the OAPS, TAB crosslinked PI aerogels are reported with improved mechanical properties but poor moisture resistance. M. A. B. Meador et al., presented the idea of replacing 50 mol. % of the diamine content with poly(propylene glycol) (PPG) to improve the moisture resistance of the TAB crosslinked PI aerogels [7]. From this work, replacing at least 50 mol. % of the ODA content with the PPG resulted in increased water contact angles of around 80° and very low moisture absorption. From another work, compared to the OAPS crosslinked aerogels, the TAB crosslinked PI aerogels made from DMBZ diamine were reported with higher surface area and increased modulus by the factor of 4 at only 26% higher density [3]. With respect to its lower cost and commercial availability, 1,3,5-benzenetricarbonyl trichloride (BTC) crosslinker was widely used in recent works on PI aerogels. From the results, the BTC crosslinked aerogels presented a comparable to even higher compression modulus, as well as higher surface area than OAPS crosslinked aerogels of similar density. Yet, the issue with the BTC crosslinked PI aerogels is their poor moisture resistance.

Even the strategy of replacing the 100% diamine content with the hydrophobic DMBZ monomer was not successful in improving the moisture resistance of the BTC crosslinked PI aerogels. In a later work, tri-isocyanate, Desmodur N3300A, was studied for crosslinking of PI aerogels as an inexpensive alternative [8]. Chemical crosslinking using tri-isocyanate was reported to result in either equal or higher mechanical properties compared to OAPS, TAB, and BTC. However, the lower onset of decomposition of tri-isocyanate resulted in reduced aerogel service temperature, which may limit its applications. Also, in a couple of studies, PI aerogels made using no chemical crosslinker were reported to be limited to those derived from pyromellitic dianhydride (PMDA). Such aerogels were reported with very high shrinkage behavior and/or high mechanical brittleness [1], [9], [10] which are unfavorable for thermal insulators or more broadly, thermal management system applications.

With respect to the disadvantages of chemical crosslinkers on PI aerogels' properties, their high cost, and environmental impacts, it would be very advantageous to provide a method of synthesis of hydrophobic, mechanically flexible, and optically transparent physically crosslinked polyimide (PCPI) aerogels to avoid using chemical crosslinking.

SUMMARY

The present disclosure provides for the fabrication of physically crosslinked polyimide (PCPI) aerogels with significantly improved properties using no chemical crosslinker. The fabricated PCPI aerogels present high moisture resistance, hydrophobic behavior, ultralow density, ultrahigh porosity, excellent thermal stability, increased mechanical strength, and high mechanical flexibility. Also, samples are successfully fabricated in a thin-film geometry with high mechanical flexibility and controlled thickness. Furthermore, some fabricated aerogel films present improved optical transparency of over 80%, which is the highest transparency reported so far for organic PI aerogels. Overall, the introduced method in this work has great potential in the facile fabrication of cost-effective PI aerogels for a wide range of practical applications, namely flexible and moisture-resistant thermal insulation, durable optical devices, wet aerogel sensors, and water filtration. With respect to the relatively fast gelation of the process, the facile physical crosslinking route developed in this work can help pave the way toward the mass production of organic aerogels with improved properties, and the developed methodology is not limited to the used material and can be applied to a wide range of monomers and chemical backbones in the field of organic aerogels.

This approach is successfully used for the fabrication of thin-film aerogel-based structures with high mechanical flexibility, high thermal insulation properties, and controlled thickness. Such structure can be embedded into electronic devices (e.g., laptops, smartphones, desktops, and microelectronics) for thermal management purposes. These include reducing heat in electronics, hotspot reduction, protecting heat-sensitive components, enhancing users' comfort, and increasing the performance and lifespan of products. The synthesis methods disclosed herein are not limited to the used material and can be applied to a wide range of monomers and chemical backbones.

Thus, the present disclosure provides a polyimide aerogel, comprising: a polyimide-based polymer of the formula 1:

Formula 1

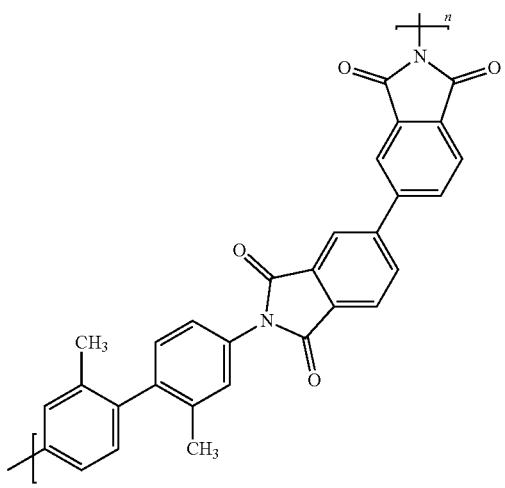

wherein n is an integer in a range between about 30 to about 50, and wherein the polymer is physically crosslinked through polymer chain entanglement.

The polyimide aerogel may have a pore size in a range from about 2 nanometers to about 100 nanometers.

The polyimide aerogel may have a pore size in a range from about 2 nanometers to about 50 nanometers.

The pore size of the polyimide aerogel may be less than about 2 nanometers.

The polyimide aerogel may have a porosity in a range from about 85% to about 99%.

The polyimide aerogel may have a porosity in a range from about 95% to about 99%.

The polyimide aerogel is free of chemical crosslinkers.

The polyimide aerogel may have a density in a range from about 0.07 g/cm$^3$ to about 0.25 gm/cm$^3$.

The polyimide aerogel may have a thermal conductivity in a range from about 15 to about 50 milliwatts/degrees Kelvin-meters.

The polyimide aerogel may be characterized by a hydrophobicity in a range from about 90 degrees to about 140 degrees water contact angle.

The polyimide aerogel may be characterized by a water uptake as low as about 1%.

The polyimide aerogel may be characterized by an onset of thermal decomposition in a range from about 500 to about 700° C.

The polyimide aerogel may be characterized by having a dielectric constant in a range from about 1.5 to about 3.

The polyimide aerogel may be in the form of a film having a thickness of at least about 80 microns, and when in thin film form may have an optical transparency in a range from about 60% to about 99%.

The polyimide aerogel may be characterized by a compressive modulus in a range from about 17 to 25 Mega Pascal (MPa).

The polyimide aerogel may be characterized by a tensile modulus in a range from about 1 to about 5 Mega Pascal (MPa).

The present disclosure further provides a process of making a polyimide aerogel comprising the steps of:

forming a wet gel by reacting a diamine monomer (DIAM) with a dianhydride monomer (DIAH) in a reaction solution comprising a dipolar aprotic solvent to form the polymer of Formula A; wherein n is between the range of 30 to 50

Formula A
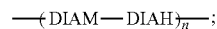

imidizing the formed polymer;
replacing the aprotic solvent with a drying solvent; and
removing the drying solvent from the formed wet gel.

The step of imidizing the formed polymer may be performed through thermal imidization or chemical imidization.

The step of imidizing may be performed via chemical imidization, wherein the chemical imidization may be performed by adding a chemical dehydrating agent to the reaction solution. The chemical dehydrating agent may be a mixture of acetic anhydride and pyridine.

The process may further comprise the step of quick gelation and aging of the wet gel to increase the polymerization yield and to advance the degree of physical crosslinking. Physical crosslinking is done by physical entanglement of the formed polymer chains and can be described morphologically. The quick gelation may occur for a period of time ranging between about 1 minute to about 10 minutes. Aging the wet gel may be done for a period of time ranging between 90 minutes and 48 hours.

The aprotic solvent may be N-methylpyrrolidinone (NMP), dimethylformamide (DMF), dimethyl sulfoxide (DMSO), or a mixture of NMP and tetrahydrofuran (THF). However, in general, the solvents may include polar organic solvents such as amides, sulfones, and ethers. As the solvent will be washed away without being involved in any chemical reaction with the polymer matrix, the type of the solvent does not significantly affect the overall process.

The process may further comprise the step of adding a chemical crosslinker to the reaction solution.

The step of reacting the DIAM monomer with the DIAH monomer is done without the use of a chemical crosslinker.

The DIAM monomer and DIAH monomer are first dissolved separately then the DIAM monomer solution is combined with the DIAH monomer solution.

The DIAM monomer is first dissolved and the DIAH monomer is added to the DIAM solution.

The diamine monomer (DIAM) may be 2,2'-dimethylbenzidine (DMBZ).

The dianhydride monomer (DIAH) may be biphenyl-tetracarboxylic acid dianhydride (BPDA).

The drying solvent may be removed via supercritical drying, freeze drying, or ambient pressure drying, and may be removed via supercritical drying, and the drying solvent may be a solvent that is soluble in liquid $CO_2$. The drying organic solvent may be ethanol, acetone, toluene, tetrahydrofuran (THF), cyclohexane, or a combination thereof.

The drying solvent may be removed via freeze drying, and the drying solvent may be water or alcohol.

The drying solvent may be removed via ambient drying, and the drying solvent may be an alcohol or acetone.

The wet gel forming step may occur over a period of time ranging between 1 min to 24 h.

The process may further comprise the step of pouring the reacting solution in a bulk monolithic mold or a thin film mold.

The process may further comprise the step of adding an additive to the reaction solution. The additive may be a polymer stabilizer, a functionalizing agent, or a combination thereof, other polymers, other aerogels, carbon nanotubes, metallic fillers or particles, organic or inorganic fibers, or organic or inorganic fillers or particles, non-woven or woven fiber reinforcement composed of a carbon precursor fiber, a glass fiber, a polymeric organic fiber, a ceramic fiber, or a biopolymer fiber.

The additive may be selected from the group consisting of polymer, aerogel, carbon nanotubes, metallic fillers or particles, organic or inorganic fibers, organic or inorganic fillers or particles, non-woven or woven fiber reinforcement composed of a carbon precursor fiber, a glass fiber, a polymeric organic fiber, a ceramic fiber, a biopolymer fiber or any combination thereof.

A further understanding of the functional and advantageous aspects of the disclosure can be realized by reference to the following detailed description and drawings.

BRIEF DESCRIPTION OF THE DRAWINGS

The disclosure will be more fully understood from the following detailed description thereof taken in connection with the accompanying drawings, which form part of this application, and in which.

DETAILED DESCRIPTION

Figure 1:
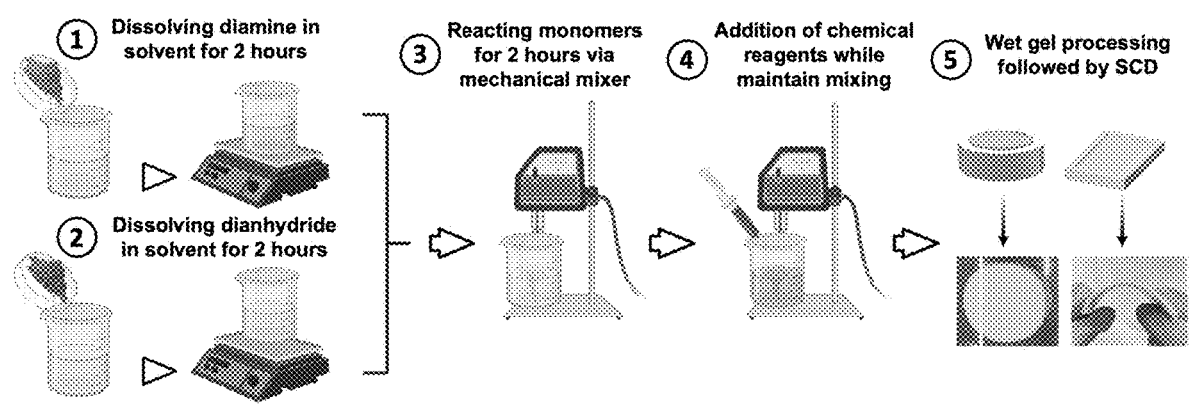
FIG. 1 illustrates the process of synthesizing physically crosslinked polyimide (PCPI) aerogels using no chemical crosslinker according to the present disclosure.

The synthesis of hydrophobic, mechanically flexible, and optically transparent polyimide aerogels is disclosed herein. Although embodiments of the present invention are disclosed herein, the disclosed embodiments are merely exemplary and it should be understood that the invention relates to many alternative forms, including different shapes and sizes. Furthermore, the Figures are not drawn to scale and some features may be exaggerated or minimized to show details of particular features while related elements may have been eliminated to prevent obscuring novel aspects. Therefore, specific structural and functional details disclosed herein are not to be interpreted as limiting but merely as a basis for the claims and as a representative basis for enabling someone skilled in the art to employ the present invention in a variety of manners.

As used herein, the terms "comprises", "comprising", "includes" and "including" are to be construed as being inclusive and open-ended, and not exclusive. Specifically, when used in this specification including claims, the terms "comprises", "comprising", "includes" and "including" and variations thereof mean the specified features, steps, or components are included. These terms are not to be interpreted to exclude the presence of other features, steps, or components.

As used herein, the terms "about" and "approximately", when used in conjunction with ranges of dimensions, compositions of mixtures, or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present invention.

As used herein, the coordinating conjunction "and/or" is meant to be a selection between a logical disjunction and a logical conjunction of the adjacent words, phrases, or clauses. Specifically, the phrase "X and/or Y" is meant to be interpreted as "one or both of X and Y" wherein X and Y are any word, phrase, or clause.

As used herein, the phrase "physical crosslinking" refers to intermolecular bonds or interactions between polymer chains without involving any chemical reactions, in this mechanism the polymer chains network is held together by entanglements due to long polymer chains with high molecular weights as well as various weak forces, such as van der Waals forces, hydrogen bonding, or dipole-dipole interactions.

Conversely, "chemical crosslinking" refers to chemical bonds being formed between the polymer chains by covalent bonds and typically requires the use of specific chemical agents. Chemical cross linkers may be selected from the group consisting of a triamine, an aliphatic amine comprising three or more amines, an aliphatic triamine, an aromatic amine comprising three or more amine groups, an aromatic triamine, 1,3,5-tri(aminophenoxy)benzene, a silica gel structure decorated with three or more amines, to give some non-limiting examples.

As used herein, the phrase "aerogel" refers to a class of mesoporous solid materials with an open-cell structure where the average pore size ranges from about 2 to about 50 nm, made by removing the liquid content of the wet gels while the solid network remains intact.

As used herein, the phrase "diamine" refers to a type of polyamine with exactly 2 amino groups". In addition to the diamine used in the non-limiting example below, others include, but are not limited to, 1. m-Phenylene diamine (m-PDA), 2. p-Phenylene diamine (p-PDA), 3,4,4-Methylene dianiline (MDA) and 4,4,4'-Oxydianiline (ODA) The present disclosure will now be illustrated with the following non-limiting example.

EXPERIMENTAL

Materials 2,2'-Dimethylbenzidine (DMBZ) and biphenyl-tetracarboxylic acid dianhydride (BPDA) were selected as diamine and dianhydride monomers respectively. In our previous study [11], the DMBZ-BPDA combination was identified as the promising backbone chemistry for the fabrication of aerogels with improved moisture resistance, mechanical strength, along with thermal stability. Yet, chemically crosslinked DMBZ-BPDA are reported with highly rigid behavior and as a result low mechanical flexibility [1]. N-methylpyrrolidinone (NMP) was selected as the solvent due to its high basic aprotic nature. To catalyze the imidization reaction and scavenge water by-product of the condensation reaction, pyridine and acetic anhydride were utilized respectively. For chemically crosslinked aerogels, 1,3,5-Tris(4'-aminophenyl) benzene (TAPB) was selected as the crosslinking agent. Ethyl alcohol 100% was selected in the solvent exchange step. All reagents were purchased from Sigma Aldrich and were used without further purification.

Characterization

The density of aerogels was measured using a caliper and an electronic scale. By comparing the retained diameter and the initial diameter of aerogels, the shrinkage was calculated. The helium pycnometer (Quantachrome Instrument Ultra-Foam 1000) was utilized in accordance with the ASTM D6226 standard to measure the porosity of samples. The electronic microscope (Field Emission SEM, Quanta, model FEG-250) was operated at 5-15 kV to assess the morphological features of the samples. Using a Perkin Elmer Spectrum, Fourier transient infrared (FTIR) was performed on PCPI aerogels to identify their chemical structures through measuring spectral transmittance and evaluation of chemical bonds. A spectral range of 4000-650 $cm^{-1}$ was used for spectra transmittance collection with a spectral resolution of 4 $cm^{-1}$.

In order to characterize the surface wetting of PCPI aerogels, a contact angle goniometer was utilized (Ossila Contact Angle Goniometer L2004A1). Using a micropipette, a water droplet was suspended on the surface of samples, and using analytical software, captured images were analyzed and WCA was recorded. Further wettability analysis was performed to assess the water uptake capability of aerogels. Similar to the previously reported methodology [12], the prepared samples were fully immersed in distilled (DI) water at 25° C. and allowed to soak for 24 hours. Then, in order to remove excess water, wet samples were wiped, and using the scale, their weights were evaluated. The water uptake of aerogels was measured using Eq. (1):

$$WU\ (\%) = ((W_f - W_i)/W_i) \times 100 \tag{1}$$

here $W_i$ and $W_f$ are the initial (before the test) and final (after the test) weights of samples respectively.

To analyze the thermal stability and obtain the onset of decomposition of aerogels, thermo-gravimetric analysis (TGA) was performed on a TA-Instrument Q50. Under the nitrogen environment, the temperature was increased from 25 to 700° C. at the rate of 10° C. $min^{-1}$, and sample weight loss was monitored. Compressive properties of monolith aerogels, including compressive modulus and strength, were evaluated based on D695-02a ASTM guidelines. Instron 5848 micro-tester was used for this purpose. All compression tests were performed at the rate of 0.05 in $min^{-1}$. Moreover, a Dynamic Mechanical Analyzer (DMA, Q800, TA Instrument) was used for the tensile strength test. The dielectric constant of aerogels was measured using an Alpha-A high-performance conductivity analyzer (Novocontrol Technologies GmbH & Co. KG, Germany) and measurements were performed in the frequency range of $10^{-1}$-$10^5$ Hz. The optical properties of samples (transmittance and haze) were measured using the PerkinElmer Lambda 1050 UV-Vis spectrophotometer with a 150 mm integrating sphere in the spectral range of 200-2500 nm.

Preparation of Physically Crosslinked Polyimide Aerogels

The preliminary studies we performed suggested the prominent role of monomers' reaction time in the formation of a highly viscous polyamic acid (PAA) precursor, leading to the physically crosslinked PI aerogels. At 14 wt % solid/solvent and the number of the repeat unit of 35 (n=35), when the diamine (DMBZ) was dissolved in NMP (in 30 min) and the dianhydride (BPDA) was added into the solution, upon 2 h monomers' reaction, it was observed that the PAA reached high viscosity, enabling the formation of a gel network even in the absence of a chemical crosslinker (PCPI-1). Subsequently, in an attempt to improve the monomers' quality of dispersion, both DMBZ and BPDA were dissolved separately in 50% NMP. A parametric study was accordingly designed to evaluate the significance of monomers' dispersion time, along with the diamine-dianhydride reacting strategy, to fully understand the contribution of processing parameters in the formation of PCPI aerogels (see Table 1).

relatively higher solids over solvent content of 14 wt %, the fabricated physically crosslinked samples showed slightly higher density ranging from 0.142 to 0.178 g cm$^{-3}$. Yet, both PCPI-3 and PCPI-6 present a density of about 0.14 g cm$^{-3}$, which is similar to the density of chemically crosslinked DMBZ-BPDA aerogels with the number of repeat units of 35, while having a lower solid-to-solvent content of 7.5 wt %. The similar density of PCPI-3 and PCPI-6 to chemically

TABLE 1

Samples' material composition and processing details

| Sample | Diamine | Dianhydride | n (repeat units) | Solid/Solvent (wt %) | Reaction Time | Fabrication Process |
| --- | --- | --- | --- | --- | --- | --- |
| PCPI-1 | DMBZ | BPDA | 35 | 14 | 2 h | DMBZ in 100% NMP 30 min, add BPDA 10 min |
| PCPI-2 | DMBZ | BPDA | 35 | 14 | 20 min | DMBZ & BPDA each in 50% NMP 30 min, mix |
| PCPI-3 | DMBZ | BPDA | 35 | 14 | 20 min | DMBZ & BPDA each in 50% NMP 60 min, mix |
| PCPI-4 | DMBZ | BPDA | 35 | 14 | 20 min | DMBZ & BPDA each in 50% NMP 24 h, mix |
| PCPI-5 | DMBZ | BPDA | 35 | 14 | 2 h | DMBZ & BPDA dissolved 60 min, 20 min mix & 100 min ageing |
| PCPI-6 | DMBZ | BPDA | 35 | 14 | 2 h | DMBZ & BPDA in 50% NMP 60 min, mix 200 rpm |
| PCPI-7 | DMBZ | BPDA (TAPB) | 35 | 14 | 30 min | DMBZ & BPDA each in 50% NMP 60 min, mix |
| CCPI | DMBZ | BPDA (TAPB) | 35 | 7.5 | 2 h | DMBZ & BPDA each in 50% NMP 60 min, mix |

As an example, formulation PCPI-6 from Table 1, consisting of 15.8 mmol % DMBZ and 16.25 mmol % BPDA at 14 wt % solid/solvent and n=35, was prepared as follows (illustrated in FIG. 1): DMBZ (3.35 g, 15.8 mmol) and BPDA (4.78 g, 16.25 mmol) were dissolved separately in 25 mL of NMP and stirred for 2 h until dissolved. Subsequently, using a mechanical mixer with a mixing speed of 200 rpm, the monomers' solutions were reacted. Acetic anhydride and pyridine were then added and mixed mechanically for 2 min. Eventually, the solution was poured into cylindrical and rectangular molds for bulk monolith and thin-film wet gel processing respectively. After 24 h ageing, the wet gels were solvent exchanged with ethanol and transferred into supercritical drying chambers for the drying stage.

Figure 2:
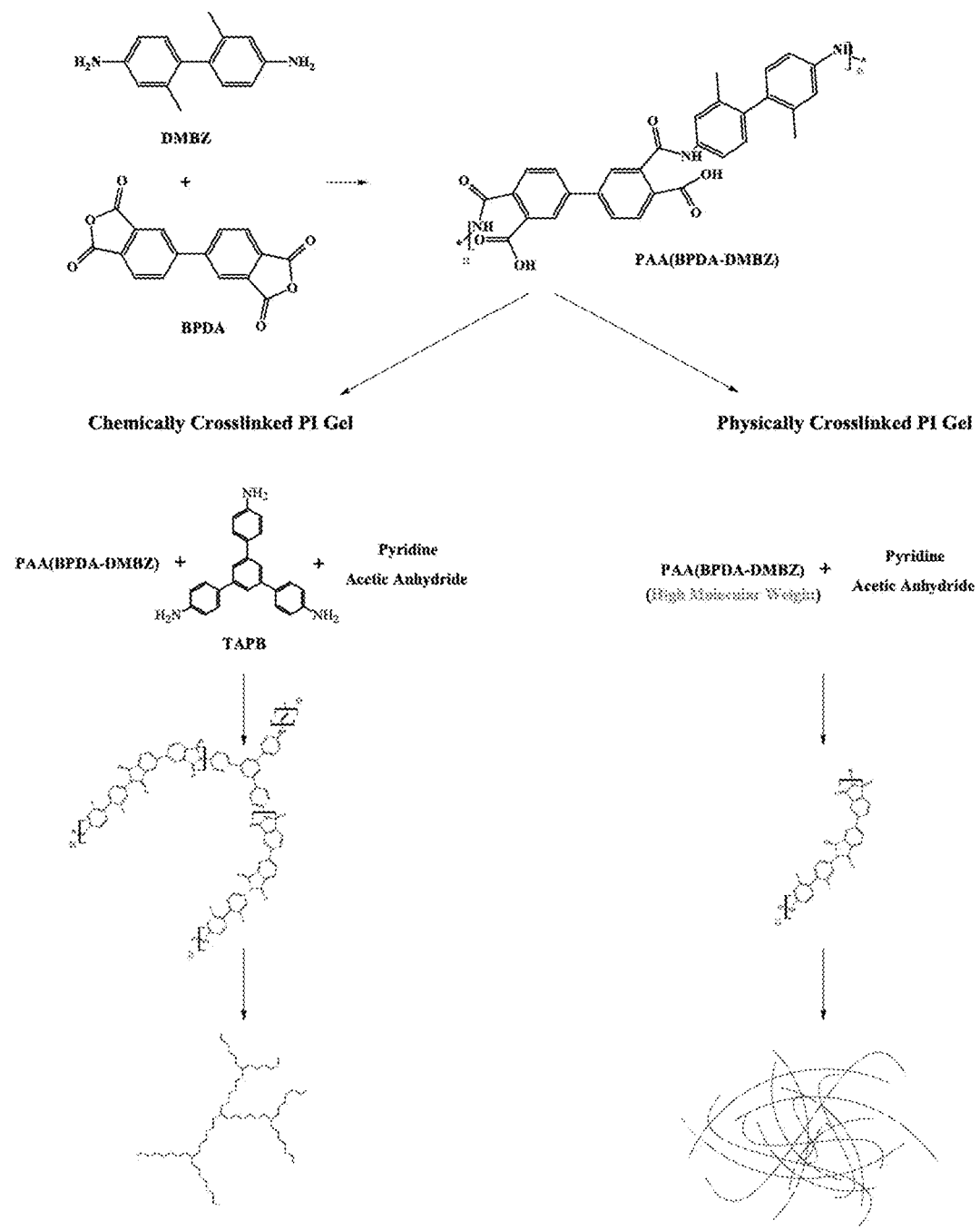
FIG. 2 shows the reaction scheme to synthesize crosslinked DMBZ-BPDA PI aerogels at 7.5 wt % solid/solvent used as a chemically crosslinked PI aerogel (CCPI) is reference chemically crosslinked PI aerogel (CCPI) for comparison purposes with respect to the PCPI aerogels synthesized in this study.

As can be observed from FIG. 1, the resultant PCPI aerogels in both bulk monolithic and thin-film geometries were obtained. In order to study the effects of combining both physical and chemical crosslinking mechanisms on PI aerogel properties, for a similar number of repeat units and solid/solvent, following a similar methodology to PCPI-3 fabrication, PCPI-7 was fabricated, yet by the inclusion of TAPB (0.109 g) as the crosslinker in the synthesis route. Furthermore, TAPB crosslinked DMBZ-BPDA PI aerogels at 7.5 wt % solid/solvent were fabricated according to FIG. 2 as the reference chemically crosslinked PI aerogel (CCPI) for comparison purposes in this study.

Results and Discussion

Density, Shrinkage, and Porosity

Figure 3A:
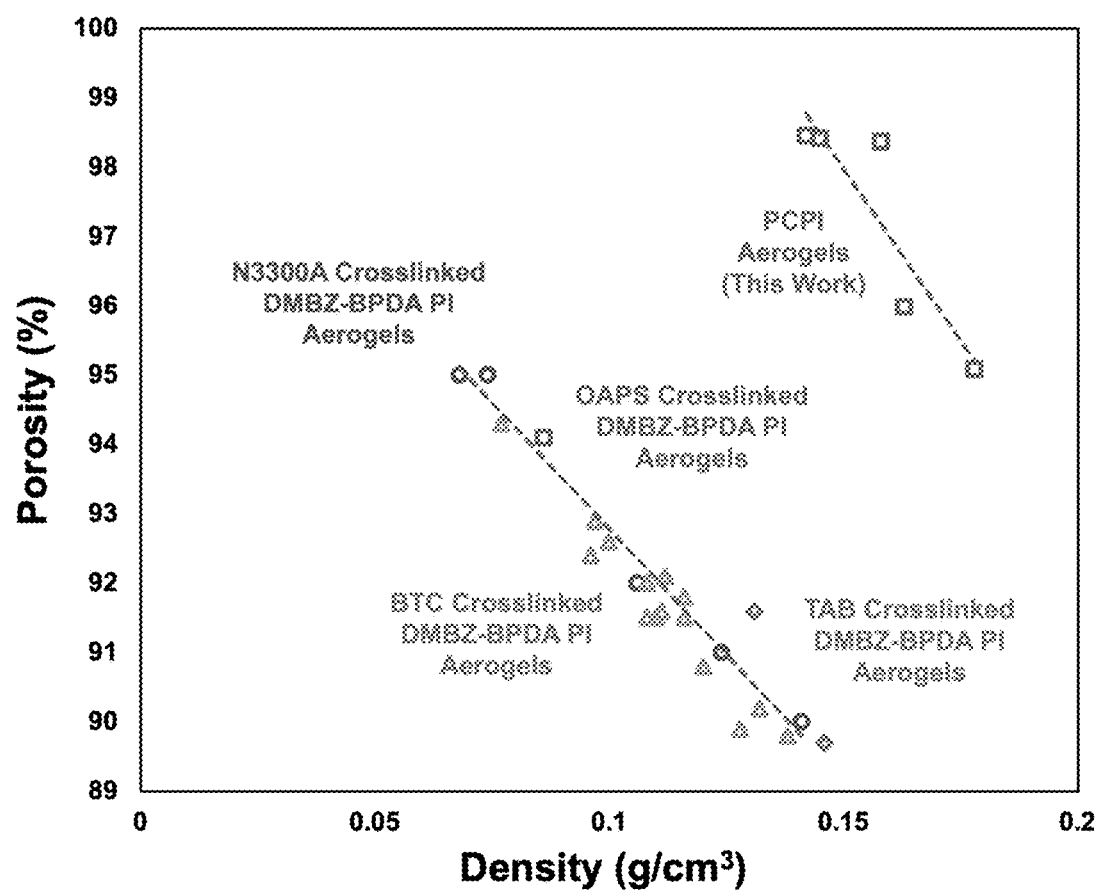
FIG. 3a is a plot of porosity (%) versus density (grams/centimeter$^3$) of PCPI aerogels compared with reported chemically crosslinked PI aerogels based on the DMBZ-BPDA backbone.
Figure 3B:
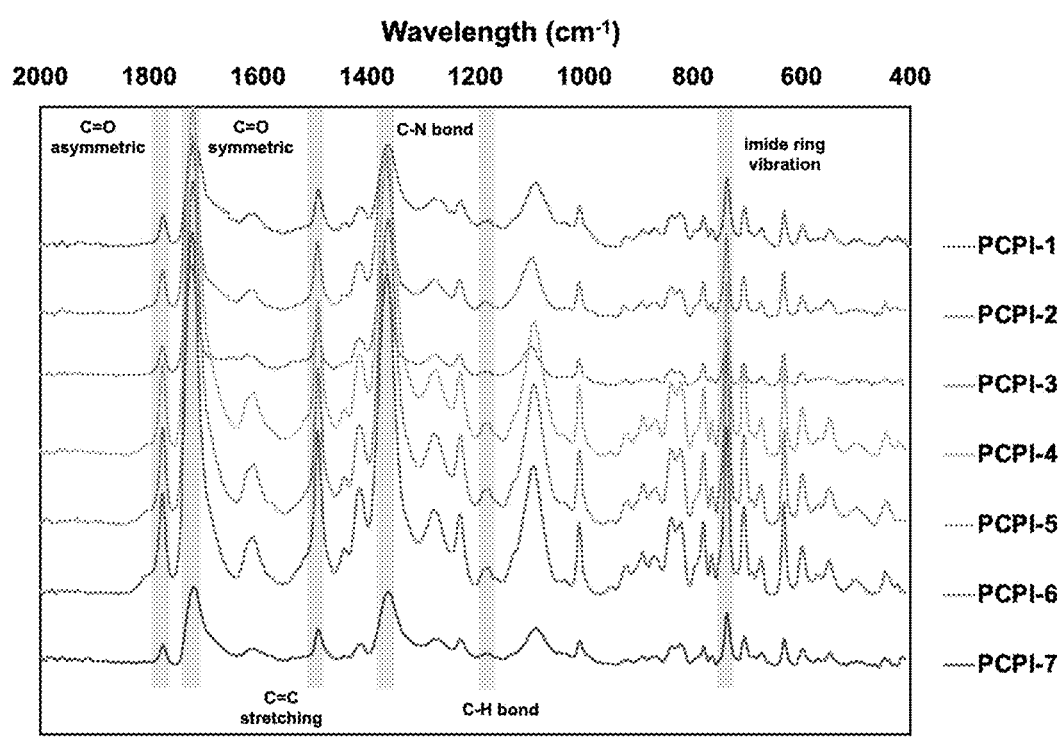
FIG. 3b is a plot of FTIR spectra of fabricated PCPI aerogels.

FIG. 3a shows the density-porosity relation of PCPI aerogels compared with reported chemically crosslinked PI aerogels based on the DMBZ-BPDA backbone. FIG. 3b presents the FTIR spectra of fabricated PCPI aerogels.

FIG. 3a offers the shrinkage behavior of the fabricated PCPI aerogels by presenting the samples' density and porosity. Similar to the previously reported aerogels, the density, and porosity of the fabricated physically crosslinked samples presented an inverse trend of reduced porosity with increased density. Furthermore, FIG. 3a summarizes the reported density and porosity of the chemically crosslinked DMBZ-BPDA aerogels from the previous works along with this work results [1], [3], [4], [8]. With respect to the crosslinked DMBZ-BPDA aerogels at lower solids to solvent content may justify the lower shrinkage and higher porosity of the PCPI aerogels.

In reaction with the BPDA dianhydride monomer, the rigid DMBZ diamine is known to result in higher porosity compared to the other diamines such as PPDA and ODA [[3]]. Compared to the chemically crosslinked PI aerogels, the fabricated PCPI aerogels presented even higher porosity with the observed porosity ranging from 95.09% to 98.46%. High porosity will be beneficial in improving a wide range of aerogel properties including but not limited to reduced weight, increased filtration efficiency, and enhanced thermal insulation performance.

From the previous works on chemically crosslinked PI aerogels, density is increased with increasing the number of repeat units and higher molecular weight [1], [8]. Based on this trend, the increased density of the fabricated PCPI aerogels at higher porosity may suggest the greater molecular weight of the fabricated PCPI aerogels compared to chemically crosslinked counterparts. Such high molecular weight and as a result longer polymer chains is the key component of the crosslinking of PCPI samples without using chemical crosslinkers.

Aerogel Morphology

Figure 3C:
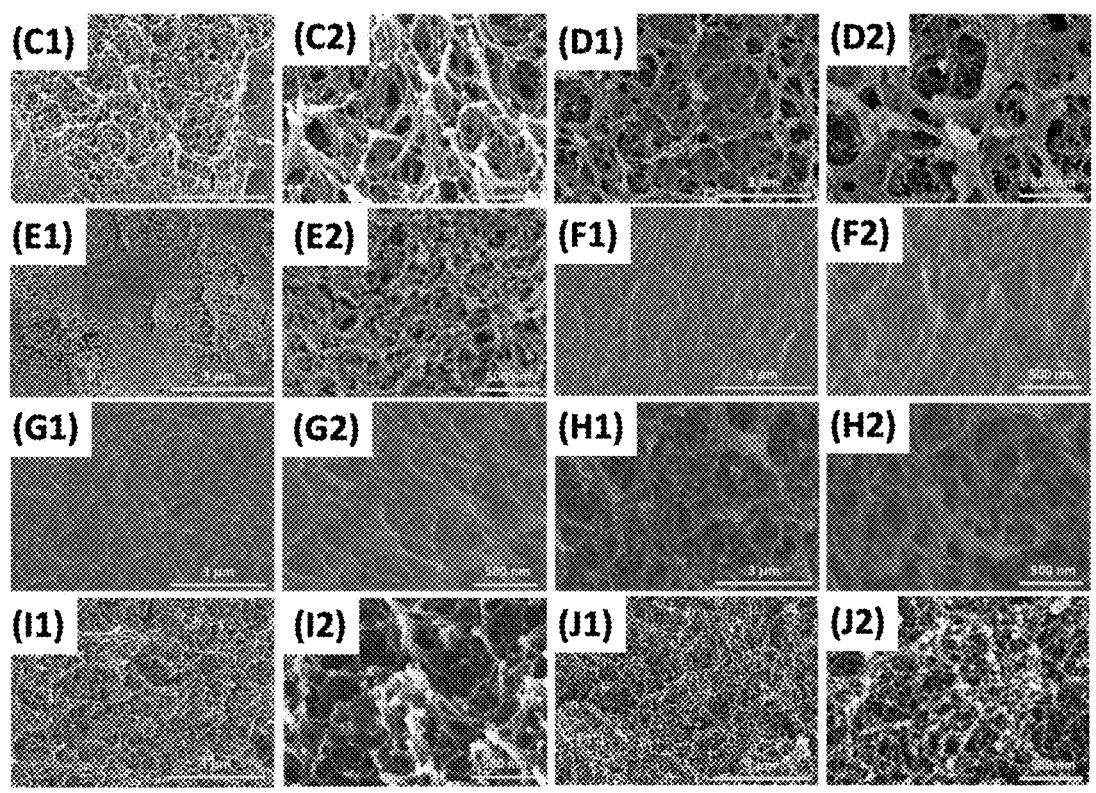
FIG. 3c are micrographs of the fabricated aerogels: (C1-C2) PCPI-1; (D1-D2) PCPI-2; (E1-E2) PCPI-3; (F1-F2) PCPI-4; (G1-G2) PCPI-5; (H1-H2) PCPI-6; (I1-I2) PCPI-7; (J1-J2) CCPI FIG. 4a are photographs (of the samples' physical state) before the test (water uptake test) shown in the upper top panel, after the test shown in the middle panel, and after drying in the lower bottom panel. Samples' names from left to right: PCPI-4, PCPI-5, PCPI-6, PCPI-3, PCPI-7

FIG. 3c presents the SEM micrograph of the fabricated aerogels. As shown in FIG. 3c, the morphology of fabricated aerogels, either physically or chemically crosslinked, is mainly formed by crosslinked polymer strands, hence presenting fibrous morphology. However, due to different processing techniques and crosslinking methods, samples presented various morphological parameters including the cell size, average fiber thickness, density of crosslinks, and morphological texture. Among the samples, the PCPI-2, which is made by both short monomers dissolving time and short reaction time, presented larger pore size as well as thicker fibers, each formed by a grouping of parallel thinner ones. This is believed to be the fact behind the higher density and lower porosity of the PCPI-2 compared to the other fabricated samples. Though the PCPI-1 is fabricated by very short monomers dissolving time and even the BPDA is added to the DMBZ solution in powder form followed by only 10 min mixing time, the longer reaction time of 2 h before the addition of the chemical reagents resulted in the formation of thinner fibers along with smaller pore size and more uniform pore structure compared to the PCPI-2. In PCPI-3, increasing the monomers dissolving time to 60 min resulted in reduced fiber thickness and smaller pore size, regardless of having a relatively short reaction time of 20 min.

This observation agrees with the porosity and density trend of the PCPI-1, PCPI-2, and PCPI-3 samples. As observed from FIG. 3c (F1) to 3c (H2), the PCPI-4, PCPI-5, and PCPI-6 presented relatively similar morphology of physically entangled fibers with increased fiber aspect ratio and reduced fiber thickness as well as lower pore size compared to PCPI-1 to PCPI-3. It can be attributed to either their longer monomers dissolving time or longer reaction time. With respect to very sensitive relations between the aerogel properties and its morphology, this suggests the importance of monomers dissolving procedure, dispersion, and reaction process on intermolecular forces during the gelation phase and as a result morphology and properties of the aerogels.

Based on the significantly faster initiation time of the physical crosslinking mechanism (1-4 min) compared to the required time for gelation using the TAPB chemical crosslinker (0.5 to 1 h), the main crosslinking and gelation mechanism in PCPI-7 is still expected to be the physical. Yet, as presented in FIGS. 3c (I1) to 3c (J2), introducing the TAPB chemical crosslinker to the DMBZ-BPDA solution significantly shifted the morphology toward chemically crosslinked DMBZ-BPDA (CCPI) morphology. This can be attributed to the role of TAPB molecules in altering the intermolecular forces during the gelation process. This approves the idea of tailoring the aerogel properties by controlling its morphology through altering the intermolecular forces by introducing other elements, molecules, or even ions to the solution system [6]. Such elements could react with the aerogel backbone or could be washed away through the solvent exchange process without changing the aerogel chemical structure yet playing a role in the alternation of the intermolecular forces and as a result in modifying the aerogel morphology.

Chemical Structures

The FTIR was carried out to identify the main characteristic bands and functional groups along with validating the successful imidization of PCPI aerogels. Looking at the FTIR results presented in FIG. 3b, four main peaks at 739, 1370, 1720, and 1775 $cm^{-1}$ can be observed which correspond to the vibration of the imide ring, C—N band, C=O symmetric band, and C=O asymmetric band respectively. C—H bonds from the benzene ring can be identified around 1150 $cm^{-1}$ with medium intensity, while the one around 1500 $cm^{-1}$ corresponds to C=C stretching. Together with the absence of anhydride C=O stretching (corresponds to BPDA starting dianhydride) and amine N—H stretching vibrations (corresponds to DMBZ starting diamine), successful imidization of PCPI aerogels is confirmed.

Hydrophobicity and Moisture Resistance

Figure 4A:
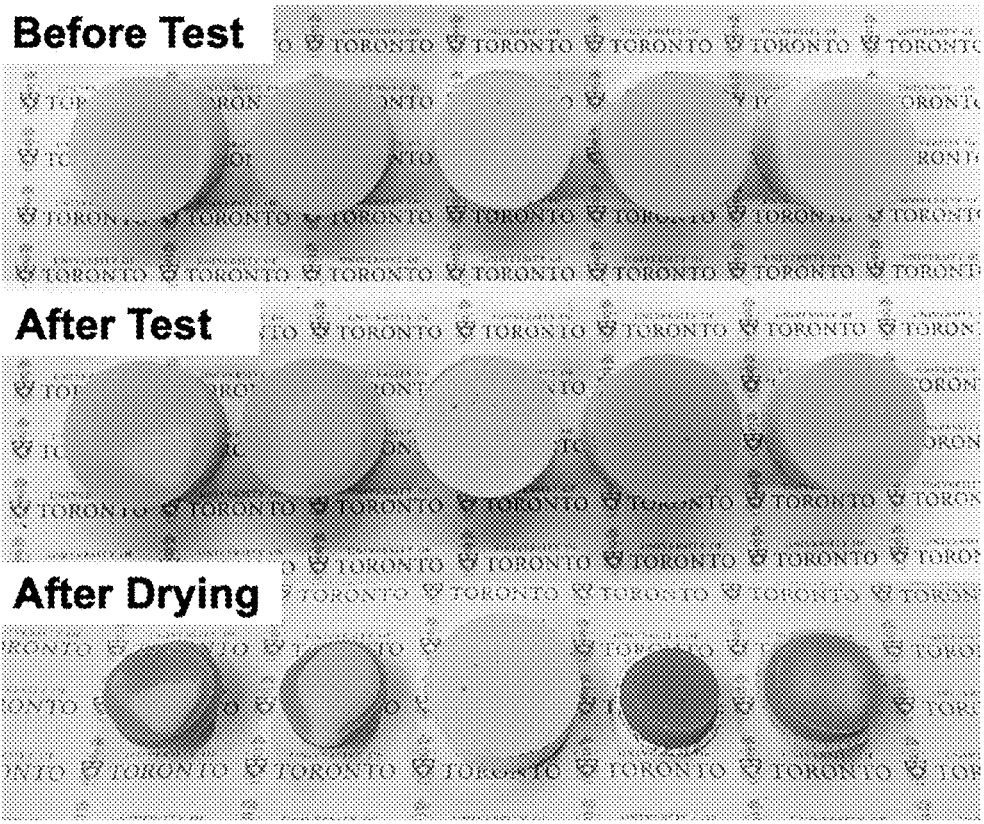
FIG. 4b is a histogram plotting diameters (millimeters) of the five (5) different identified aerogels before the test (left most histogram), after the test (middle histogram), and after drying (right most histogram).
FIG. 4c is a histogram plotting the weight (grams) of the five (5) different identified aerogels before the test (left most histogram), after the test (middle histogram), and after drying (right most histogram).
Figure 4B:
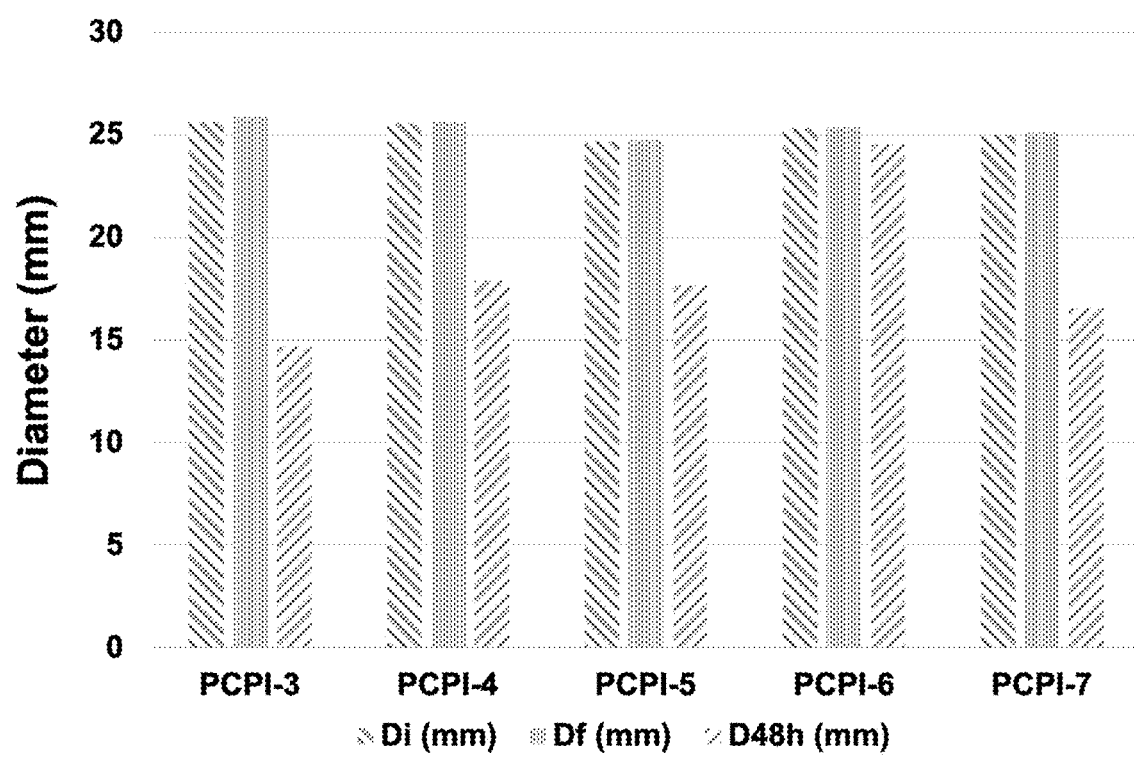
Figure 4C:
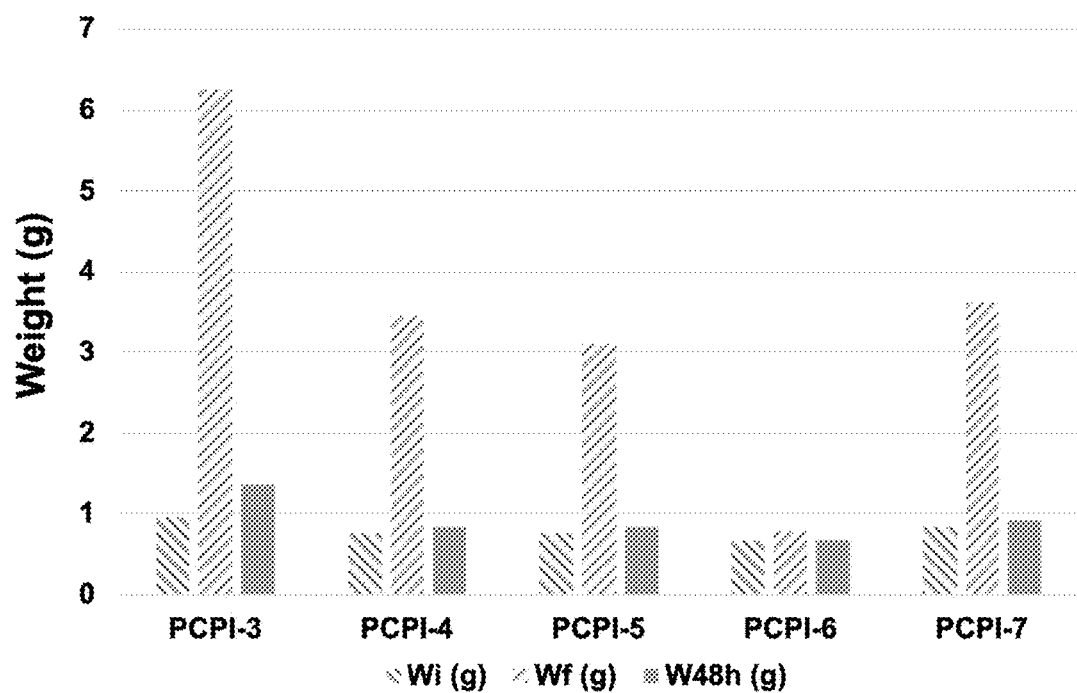

The wettability properties of PCPI aerogels were evaluated through the measurement of water uptake along with the water contact angle (WCA) to shed light on the hydrophobicity and moisture resistance of prepared aerogels. Our previous studies showed that pristine PI aerogels synthesized via the chemical crosslinking route exhibited super hydrophilicity resulting from the polar structures of PI; therefore the resultant PI aerogels cannot be employed in moisture-sensitive environments. In this work, in an attempt to assess the moisture resistance of fabricated PCPI aerogels, the water uptake test was carried out in which by comparing the weight of samples before and after the test, the water uptake ratio of samples was calculated. FIG. 4a shows the variation of samples' physical state in time in the water uptake test. Samples' names from left to right: PCPI-4, PCPI-5, PCPI-6, PCPI-3, PCPI-7. FIG. 4b shows the variation in the diameter of samples in the water uptake test. FIG. 4c shows the variation of weight of samples in the water uptake test ($D_i$: initial diameter of the sample before the test; $W_i$: initial weight of the sample before the test; $D_f$: final diameter of the sample after the test; $W_f$: final weight of the sample after the test; $D_{48h}$: diameter of the sample after 48 h drying; $W_{48h}$: weight of the sample after 48 h drying).

As can be observed in FIG. 4a, bulk monolithic aerogels were prepared, and their physical state was monitored right after the test as well as after 48 h drying at room temperature. It is evident that except PCPI-6 (middle sample), the other aerogels absorbed a significant amount of water (water uptake in the range of 300-551%) and their colors turned into dark yellow confirming the presence of water. PCPI-3, for instance, with an initial weight and diameter of 0.96 g and 25.6 mm, respectively, experienced a weight increase of approximately 551% (water uptake=551%) with a final weight of around 6.26 g. Looking at the dimensional stability of PCPI-3, it can be seen that due to the immediate water penetration, the diameter of aerogels increased slightly (swelling behavior). However, as expected, upon drying the samples, they experienced considerable shrinkage (~42% for PCPI-3), and structural deformation was notable. This observation was consistent among all tested aerogels, see FIGS. 4b and 4c.

Surprisingly, PCPI-6 exhibited an ultralow water uptake of ~15%, considerably lower than previously reported PI aerogels including poly(maleic anhydride) crosslinked PI aerogels (up to 700%) [13], bis(trimethoxysilylpropyl)amine (BTMSPA) crosslinked ODA-BPDA aerogels (up to 500%) [14], and 1,3,5-Triaminophenoxybenzene (TAB) crosslinked ODA-BPDA aerogels (up to 383%) [15]. The excellent moisture resistance of PCPI-6 was also comparable to other chemically-modified PI aerogels namely the ones with the incorporation of 1,12-dodecyldiamine (DADD) [16], 2,2-bis(3,4-dicarboxyphenyl)hexafluoropropane dianhydride (6FAPB) [15], and 2,2-Bis [4-(4-aMinophenoxy) phenyl]propane (BAPP) [14]. Benefiting from its low ultralow water uptake, PCPI-6 showed the ability to maintain its physical structure during the test and did not collapse which could be due to the strong physical crosslinking of the aerogel network.

To better understand the moisture-resistant behavior and ultralow water uptake of PCPI-6, contributing factors in the process of water absorption in PI aerogels should be discussed first. One major factor is the hydrophobicity/hydrophilicity of the polymer chains which must be considered. When the polymeric backbone contains —O— (like the one in ODA), it is more likely that the resultant PI aerogels will be susceptible to moisture as was observed in previous studies. In contrast to ODA structure, DMBZ was reported to improve hydrophobicity which is due to its chemical structure. In general, to characterize the wettability of the surface, WCA is measured. The WCA of over 90° indicates the fact that wetting of the surface is unfavorable.

Figure 5A:
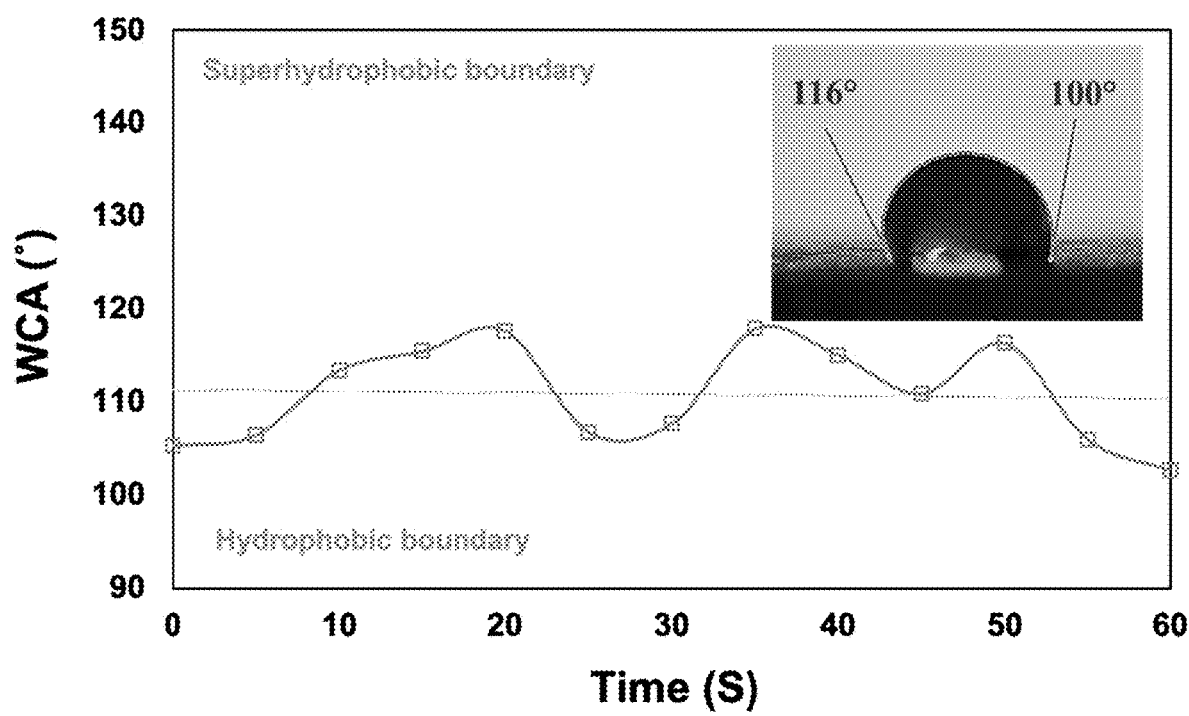
FIG. 5a is a plot of WCA (moisture resistance capability of aerogels) versus time.
Figure 5B:
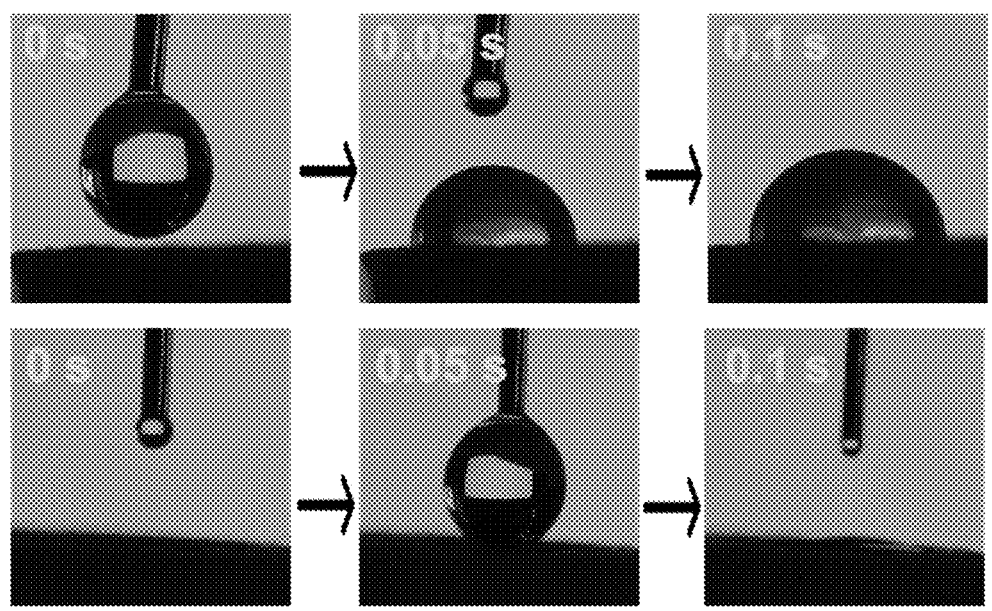
FIG. 5b is a series of photographs showing the wettability behavior of the aerogels in different time frames (top row) PCPI-6 aerogel (bottom row) CCPI aerogel.
Figure 5C:
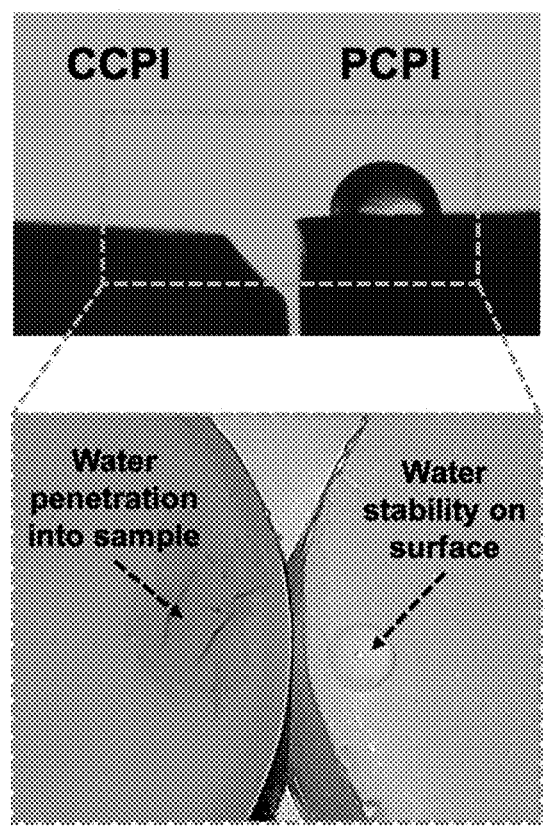
FIG. 5c is a photograph comparing the wettability of PCPI-6 with CCPI aerogel (upper panel) showing that the water droplet was absorbed fairly quickly which led to the surface disintegration of PCPI-6 compared to the CCPI aerogel (lower panel).

FIG. 5a shows the wettability behavior of fabricated aerogels, the WCA of PCPI-6, and its stability over time. FIG. 5b shows a comparison of the wettability behavior of PCPI-6 aerogel with hydrophobic characteristics (top row) with chemically crosslinked PI aerogels with super hydrophilic features (bottom row) in different frames, and FIG. 5c shows the surface wettability behaviors of PCPI-6 and CCPI aerogels. Looking at the WCA measurement results in FIG. 5a, it is notable that PCPI-6 exhibited hydrophobicity with a WCA of around 110°. Although the material was not superhydrophobic (above 150°), the obtained WCA is barely seen in PI aerogels as they commonly suffer from super hydrophilicity. Comparing the wettability of PCPI-6 with CCPI aerogel in FIG. 5b, it can be seen that for CCPI aerogel, the water droplet was absorbed fairly quickly which led to the surface disintegration as is evident in FIG. 5c. On the other hand, the water droplet was quite stable on the surface of the PCPI-6 counterpart, and no structural damage was observed which confirmed its hydrophobicity. Therefore, it can be concluded that due to the hydrophobicity of the material, the water penetration into the pores was effectively hindered which led to the ultralow water uptake.

Another influential factor is the morphological characteristic of aerogels including crosslinking degree and the mesoporous structure. It is well known that the aerogel pore size and pore structure have a considerable impact on their water uptake. As explained by Guo et al. [13], aerogels with larger pore sizes allow water in more easily resulting in higher water uptake. This phenomenon was not only observed in PI aerogels, but it applies to other aerogels e.g. cellulose-based aerogels [17]. Further and even more importantly, though, the physical crosslinking of PCPI aerogels played a critical role in their moisture-resistant capability. With the application of mechanical mixing in the fabrication of PCPI-6, the physical crosslinking of the wet gel network was strengthened and along with the higher degree of entanglements, a decrease in water uptake resulted. Moreover, observation of similar hydrophobic behavior from smaller cuts of the samples presented that the moisture resistance of the fabricated aerogels is not due to their surface (skin) properties.

Thermal Stability

Figure 6A:
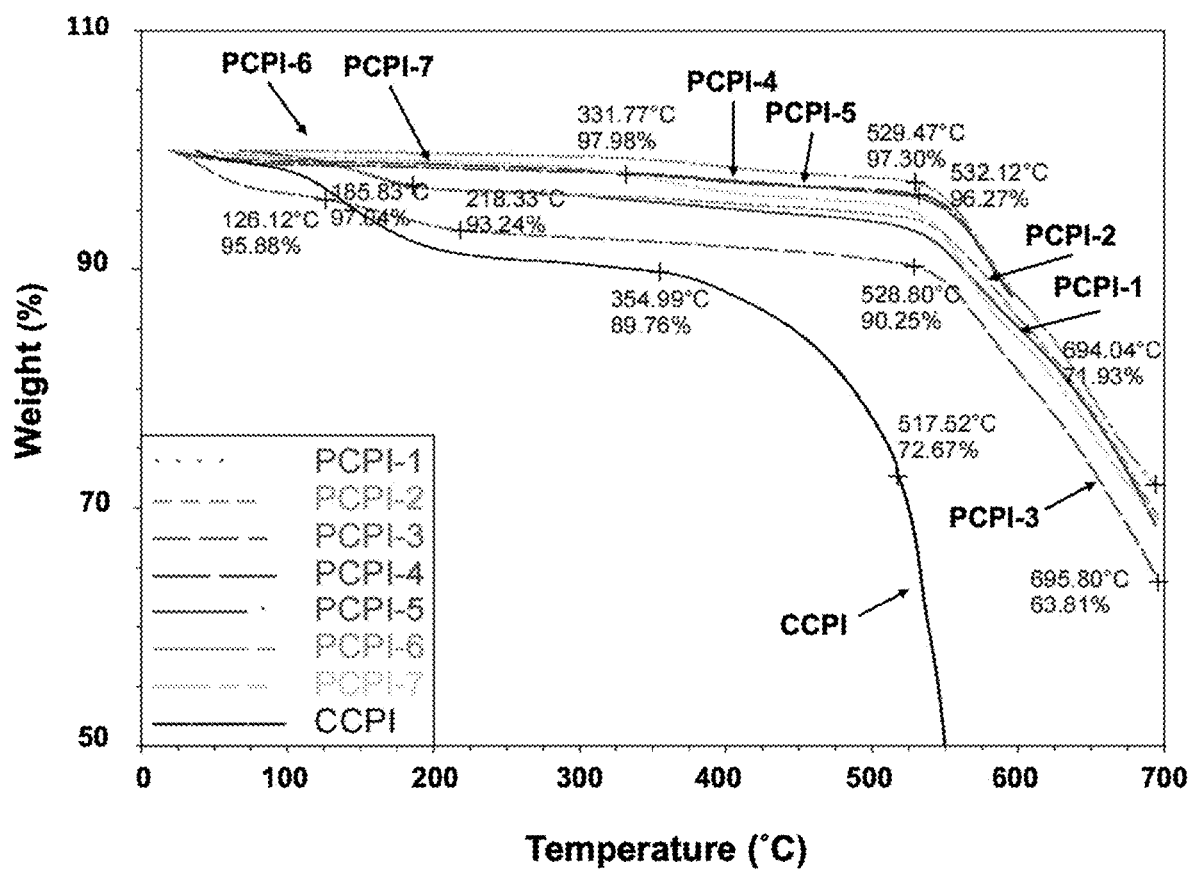
FIG. 6a is a plot of temperature vs. weight percentage in the TGA analysis of aerogels.
Figure 6B:
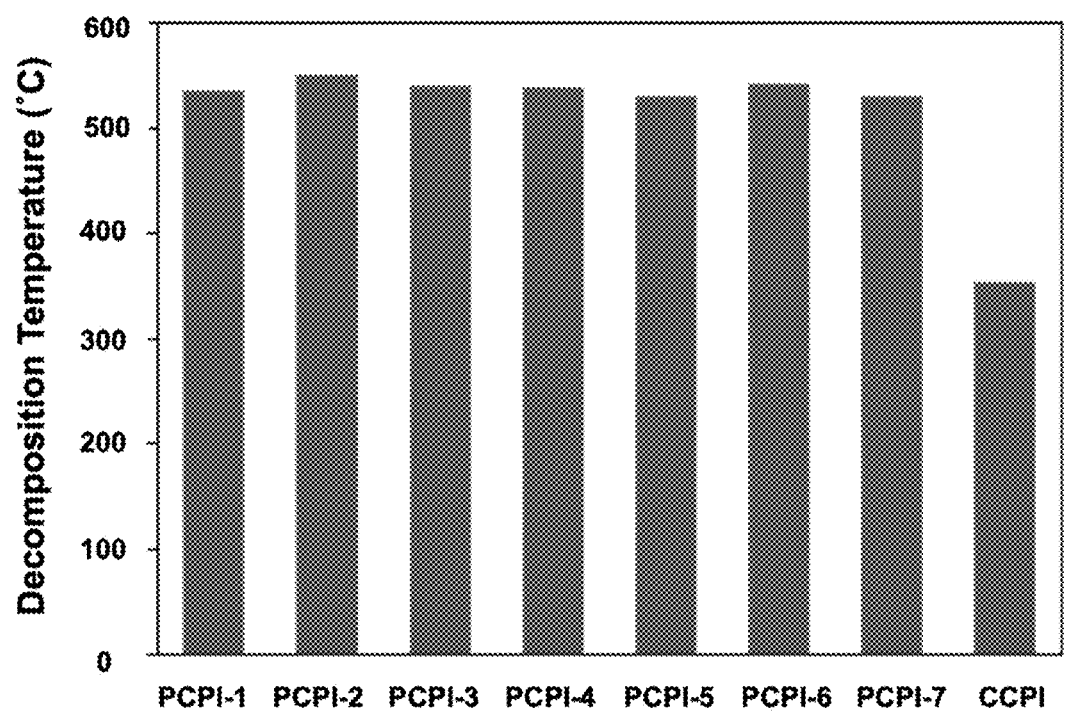
FIG. 6b is a histogram plotting the decomposition temperature of aerogels.
Figure 6C:
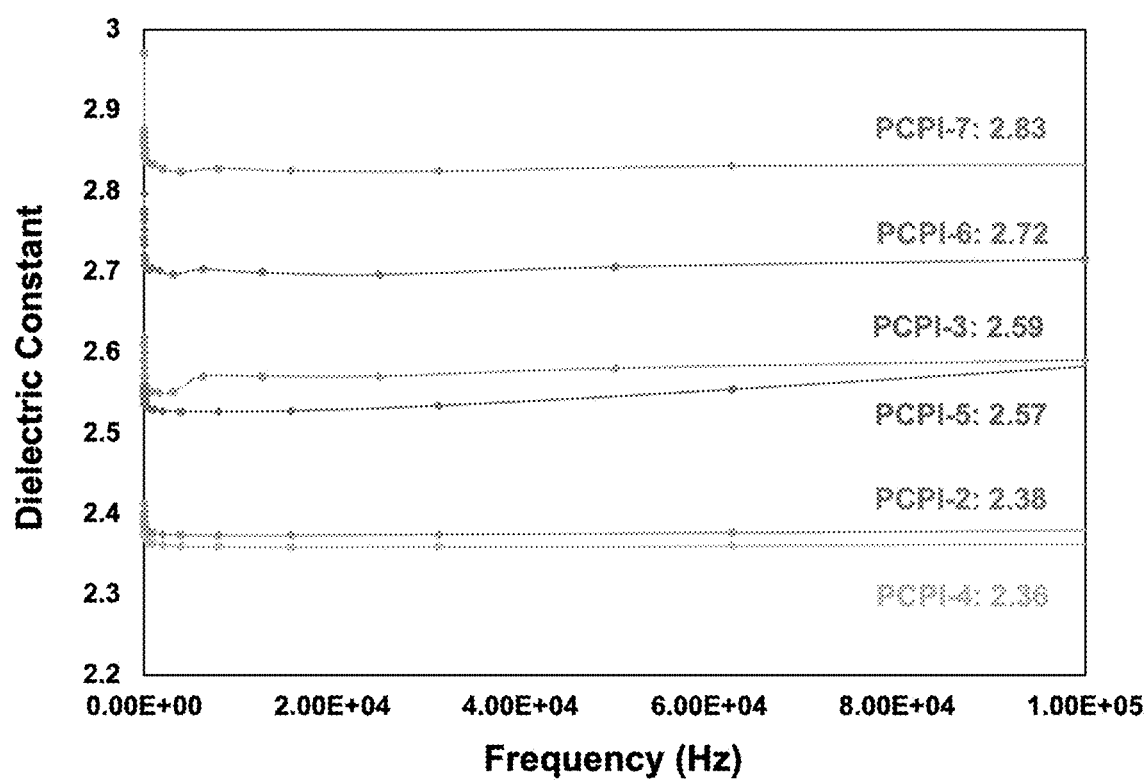
FIG. 6c is a plot of frequency (Hz) vs. dielectric constant of aerogels.
Figure 6D:
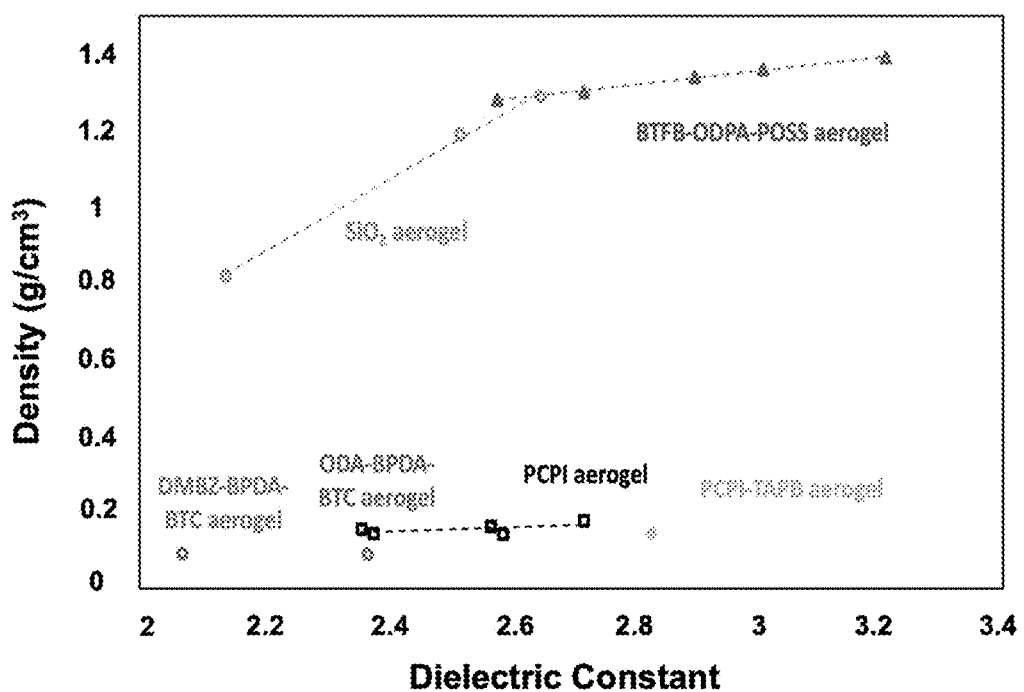
FIG. 6d is a plot of the dielectric constant vs. density (grams/centimeter$^3$) of PCPI aerogels compared to other aerogels.

FIG. 6a shows the thermal gravimetric analysis (TGA) results of the fabricated aerogels; FIG. 6b shows the onset of decomposition of aerogels; FIG. 6c shows the dielectric constant variation of studied aerogels at different frequencies; and FIG. 6d shows the dielectric constant-density relation of PCPI aerogels compared with other aerogels (references for data: $SiO_2$ aerogel [18], [19], BTFB/ODPA/POSS aerogel [20], ODA-BPDA-BTC aerogel [11], DMBZ-BPDA-BTC aerogel [11]).

FIGS. 6a and 6b present the TGA results and onset of decomposition of the fabricated aerogels, respectively. Despite the processing method, the fabricated PCPI aerogels presented a similar decomposition temperature ($T_d$) of about 530° C. This shows an increase in $T_d$ over the chemically crosslinked PI aerogels with a comparable number of repeat units and backbone chemistry, with the $T_d$ ranging from 510 to 520° C. The lower decomposition temperature of chemically crosslinked PI aerogels is related to the chemical crosslinker type. The high decomposition temperature of PCPI aerogels along with their relatively lower weight loss before the $T_d$, ranging from 2.7 to 9.75 wt %, suggest their improved thermal stability over the chemically crosslinked counterparts. Furthermore, tailoring the processing parameters for the PCPI-4 to PCPI-6 resulted in a further decrease in the weight loss before the $T_d$. Among the samples, the PCPI-6 presented the lowest weight loss before the $T_d$ of only 2.7 wt %. The weight loss of less than 5 wt % at decomposition temperature may also indicate complete imidization.

As seen in FIG. 6a, both chemically crosslinked DMBZ-BPDA aerogel (CCPI) and the PCPI-7, which contains a similar TAPB crosslinker presented a weight-loss trend between 33° and 517° C. Also, the PCPI-1, PCPI-2, PCPI-3, and the CCPI sample presented an initial weight loss of less than 200° C. Such a weight loss trend could be due to either slightly incomplete imidization or moisture content. Yet, above 200° C. and before the onset of decomposition at 530° C., the PCPI-1 to PCPI-3 presented a relatively similar decomposition trend to PCPI-4 to PCPI-6, with a weight loss of about 3 wt %. The PCPI aerogels presented a char yield of 64 to 72 wt % in the nitrogen environment, which is in the range of previously reported chemically crosslinked PI aerogels with comparable backbone chemistry [4].

Electrical Properties

Due to the nano-sized structure and highly porous network of aerogels, they typically exhibit ultralow dielectric constants, which are desirable for applications like microelectronics, antennas, and microwave circuitry. In this study, in order to measure the dielectric constant of prepared PCPI aerogels, an Alpha-A high-performance conductivity analyzer was employed. All aerogel samples were equilibrated at atmospheric conditions, and the dielectric permittivity measurement was carried out at 298 K for the frequency range of $10^{-1}$-$10^5$ Hz. Both the real part (also known as dielectric constant) and the imaginary part (also known as loss factor) were measured. The dielectric constants of PCPI aerogels at varied frequencies are shown in FIG. 6c. As can be seen, the dielectric constant fell in the range of 2.36-2.83, in which PCPI-4 and PCPI-7 possessed the lowest and highest values, respectively.

In general, it is known that the dielectric constant of aerogels is dominated by the chemical backbone structure, and more importantly the free volume fraction of the aerogel network (i.e., degree of porosity). Based on this principle, for PCPI-1 to PCPI-6 samples with similar compositions, it can be fairly suggested that the dielectric constant is closely related to their porosity (or density), the lower the density, the higher the porosity, and the lower the dielectric constant. Such a relation is depicted in FIG. 6d. As an example, it can be seen that PCPI-2, with the highest density (0.178 g cm$^{-3}$), displayed the highest dielectric constant (2.72). Such a dependency is not only for PCPI aerogels but looking at FIG. 6d, it is evident that for other inorganic and organic aerogels, density is a prominent factor in the dielectric properties of aerogels. Among the fabricated aerogels in this work, surprisingly, with the incorporation of a crosslinking agent in PCPI-7, despite its low density, the dielectric constant showed the highest value of 2.83. Compared to PCPI-6 with a similar density, such a high value may reflect the effect of the different chemical structure and/or morphology of PCPI-7 on its resultant dielectric properties. The dielectric constant achieved in this study was comparable to the one for ODA-BPDA-BTC aerogel and slightly higher than DMBZ-BPDA-BTC aerogel. Moreover, at similar dielectric constant values, PCPI aerogels displayed a few times lower density, which ensures the application of these products in the next generation of electronic devices to satisfy both low dielectric constant and lightweight.

Mechanical Properties

Figure 7A:
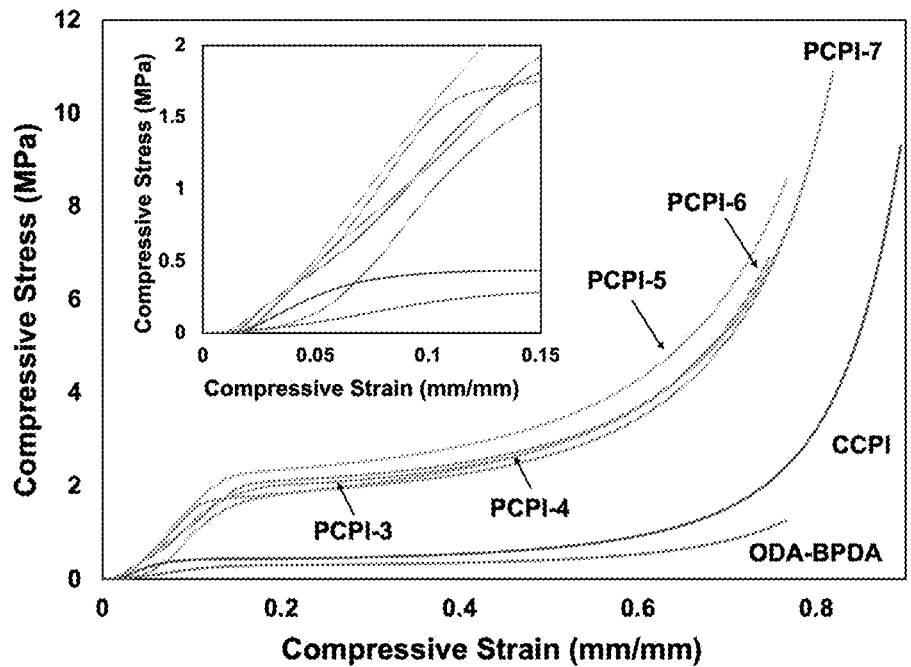
FIG. 7a is a plot of compressive strain (mm/mm) vs. compressive stress (MPa) of aerogels.
Figure 7B:
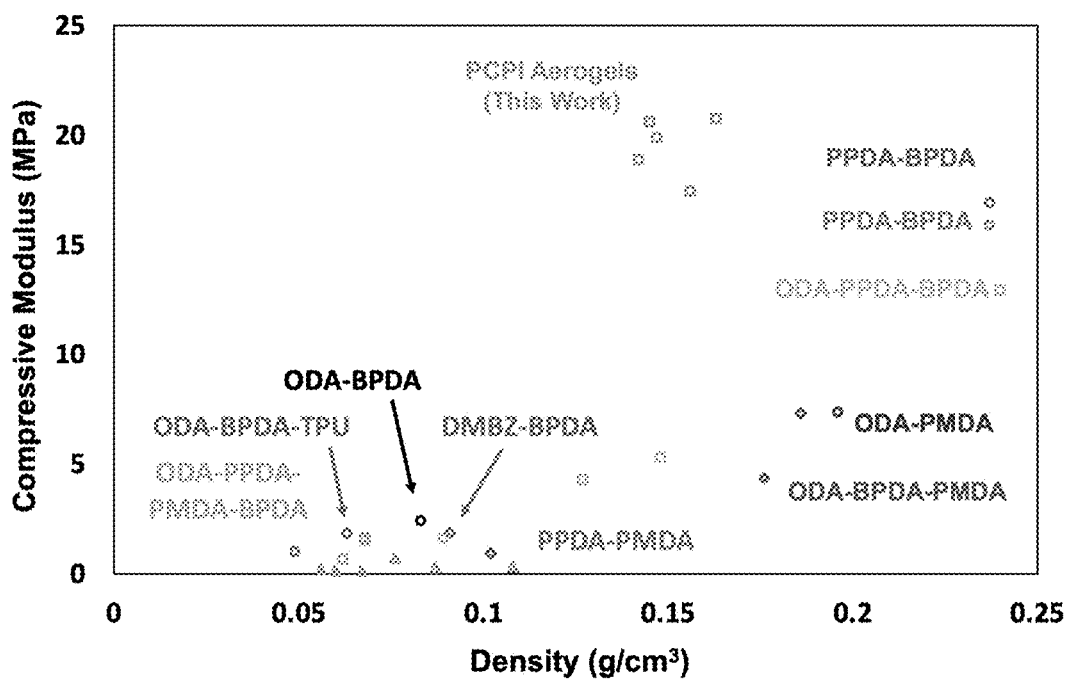
FIG. 7b is a plot of density (grams/centimeter$^3$) vs. compressive modulus (MPa) of PCPI aerogels compared to other aerogels.
Figure 7C:
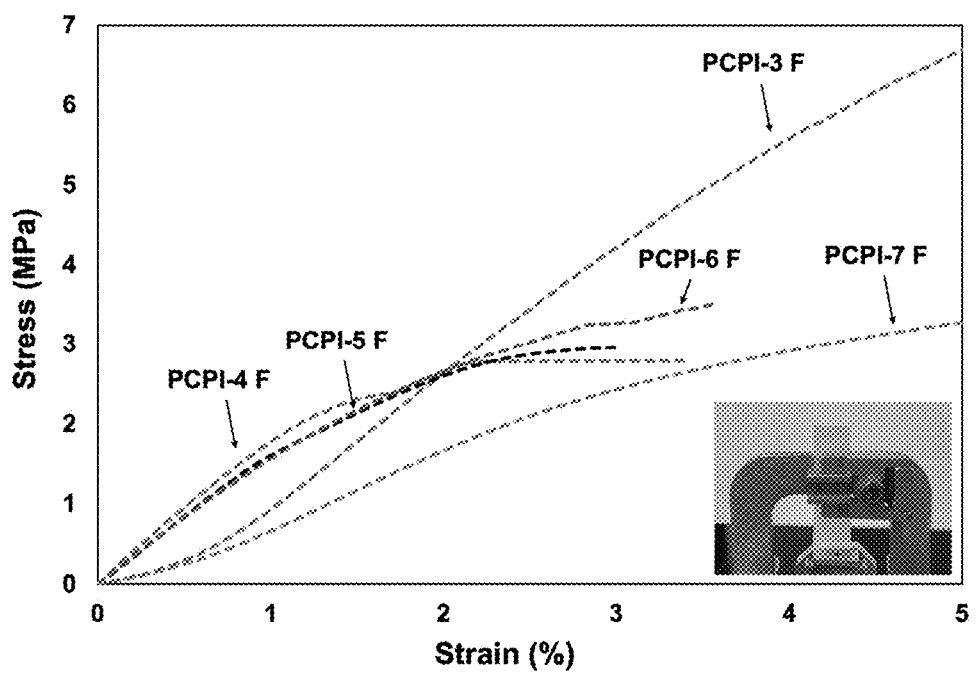
FIG. 7c is a plot of strain (%) vs. stress (MPa) of aerogels.
Figure 7D:
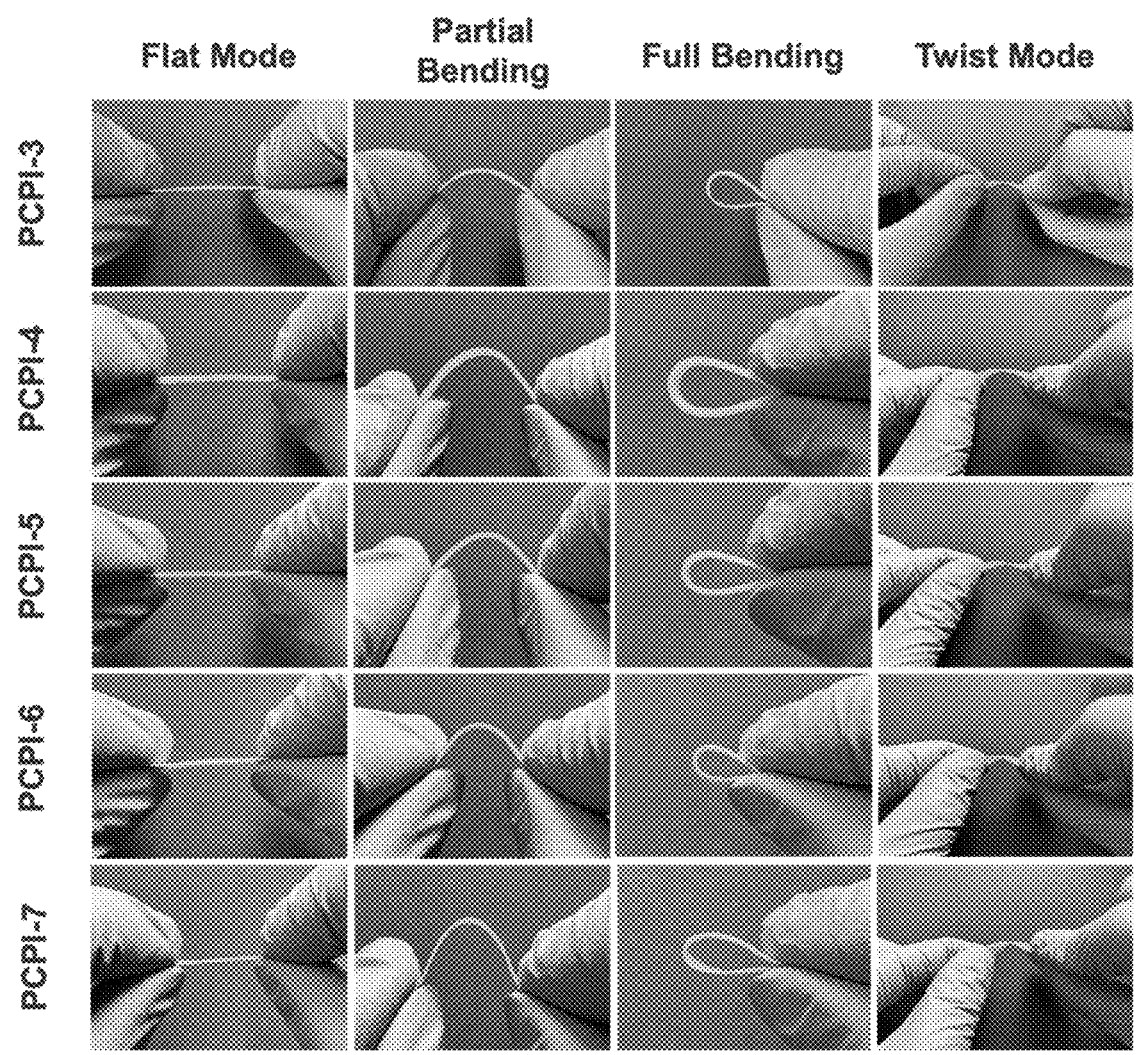
FIG. 7d is a series of photographs showing the flexibility of aerogels.

FIG. 7a shows compressive stress vs. strain of fabricated aerogels while FIG. 7b is a compressive modulus—density graph of PCPI aerogels compared with previously reported PI aerogels (references for data: PPDA-PMDA [5], [10], ODA-PPDA-PMDA-BPDA [5], ODA-BPDA [5], [11], PPDA-BPDA [5], ODA-PMDA [5], ODA-BPDA-TPU [6], ODA-PPDA-PMDA [21], PPDA-BPDA [21], ODA-PPDA-BPDA [21], DMBZ-BPDA [11]). FIG. 7c is a graph of tensile stress vs. strain of fabricated aerogels, and FIG. 7d shows a demonstration of thin-film aerogels' flexibility, bendability, and twistability.

The compressive modulus and strength of PCPI aerogels were characterized using mechanical compression tests based on ASTM D695-02a. The cylindrical aerogels were subjected to compressive stress at the rate of 0.05 in min$^{-1}$, and upon monitoring stress-strain curves, modulus $E_c$ (initial slope of the curve) and strength (yield point achieved after linear elastic region) were recorded. Looking at stress-strain curves in FIG. 7a, three deformation regimes of the elastic region, plateau, and densification region can be seen. PCPI aerogels, owing to their strong physically crosslinked 3D network, showed favorable toughness and could absorb compressive energy. After being compressed to over 70% strain, the compressive strength of up to 2.2 MPa was achieved, which is about 40 times greater than the values measured for PPDA-PMDA PI aerogels [10] and around 10 times greater than the one for ODA-BPDA PI aerogels [22]. The compressive strength was also superior to other aerogels, including cellulose [23], [24], carbon [25], and silica [26], [27] aerogels.

The synthesis strategy disclosed herein has also promoted the elastic modulus of developed aerogels compared to other PI aerogels. Such an enhancement is highlighted in FIG. 7b, in which the superior mechanical performance of PCPI aerogels is demonstrated. The compressive modulus of over 20 MPa was obtained in this study, which is significantly larger than the reported one in state-of-the-art PI aerogels [5], [10], [11], [21]. Even compared to hybrid aerogels and the ones with the inclusion of thermoplastic polyurethane (TPU) nanofibers, PCPI aerogels have superior performance. At the same time, they maintained a lower density (0.142-0.178 g cm$^{-3}$). This can be attributed to the higher molecular weight in strengthening the physically cross-linked network by enhancing the polymer chains entanglement. In fact, the longer polymer chains of PAA (as was observed through increased solution viscosity) have provided more network entanglement in PCPI aerogels. Consequently, more crosslinking points were more prone to be formed, and compared to the chemically crosslinked counterparts, improved mechanical properties were achieved.

For all compositions listed in Table 1, thin-film PCPI aerogels can also be fabricated using the film-casting method. As shown in FIG. 7d, all fabricated thin-film aerogels exhibit excellent mechanical flexibility. When they were subjected to partial and/or full bending, no obvious structural damage was seen, and even when they were fully twisted, they maintained their structural integrity and could return to their original shape without collapsing. This indicates the significant role of chains entanglement in the physically crosslinked network of PCPI aerogels in enabling such formability and flexibility. Generally, DMBZ is considered a rigid diamine (with more brittle characteristics), which should be partially/completely replaced with other flexible diamines (e.g. ODA) to improve network flexibility. However, we could realize that the physical crosslinking strategy proposed in this work can even be used for the development of highly flexible and scalable PI aerogels based on rigid monomers.

In fact, the development of flexible thin-film aerogels with improved thermal and mechanical properties using facile strategies has been a longstanding challenge. Although in the past few years, flexible aerogel films based on graphene, cellulose, silica, and even PI have been reported, they are either complicated to prepare or limited for large-scale production due to their high costs. In this context, the development of more cost-effective and facile strategies, such as the one proposed in this study, can be of great interest to further extend the application of PI aerogels in practical fields namely aerospace, insulation of buildings, microelectronics, and even winter clothing.

Typical stress-strain curves of PCPI aerogel films from tensile tests are shown in FIG. 7c. The tensile modulus in the range of 1-1.8 MPa was achieved. Among the tested aerogel films, it was noted that only PCPI-7 F (in which crosslinking agent was incorporated) cracked during the test, while the other PCPI aerogels continuously stretched until the DMA setup reached its ultimate force capacity. This observation was consistent with compression test results, in which PCPI-7 showed the lowest compressive strength. Based on tensile test results, it can be clearly noticed that the physical crosslinking strategy was effective in improving the tensile modulus and strength of aerogel films. This can be explained as the entangled polymer network in PCPI aerogels forming a tight connection between molecular chains. As discussed previously, due to the stress concentration on these joint points, the tensile properties can be improved.

Optical Transparency

Figure 8A:
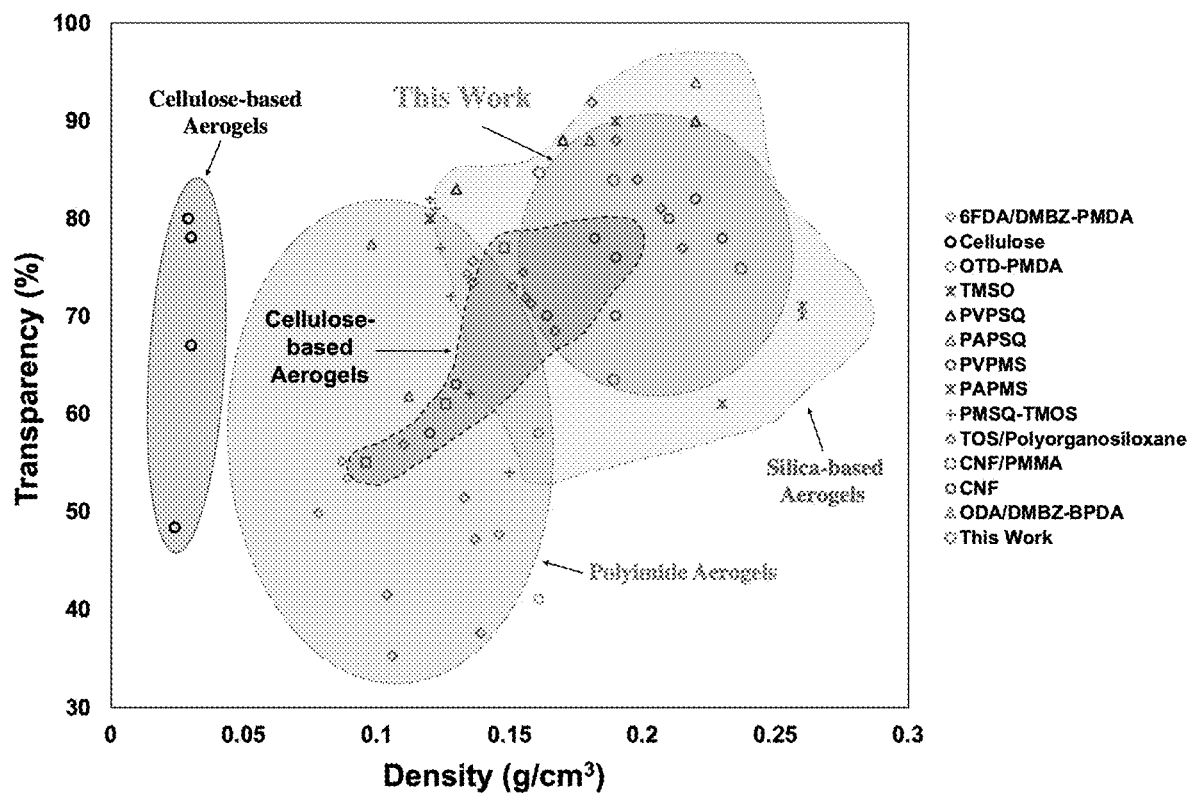
FIG. 8a is the plot of transparency (%) versus density (g/cm$^3$) of PCPI aerogels (This Work) compared to cellulose-based, polyimide, and silica-based aerogels.
Figure 8B:
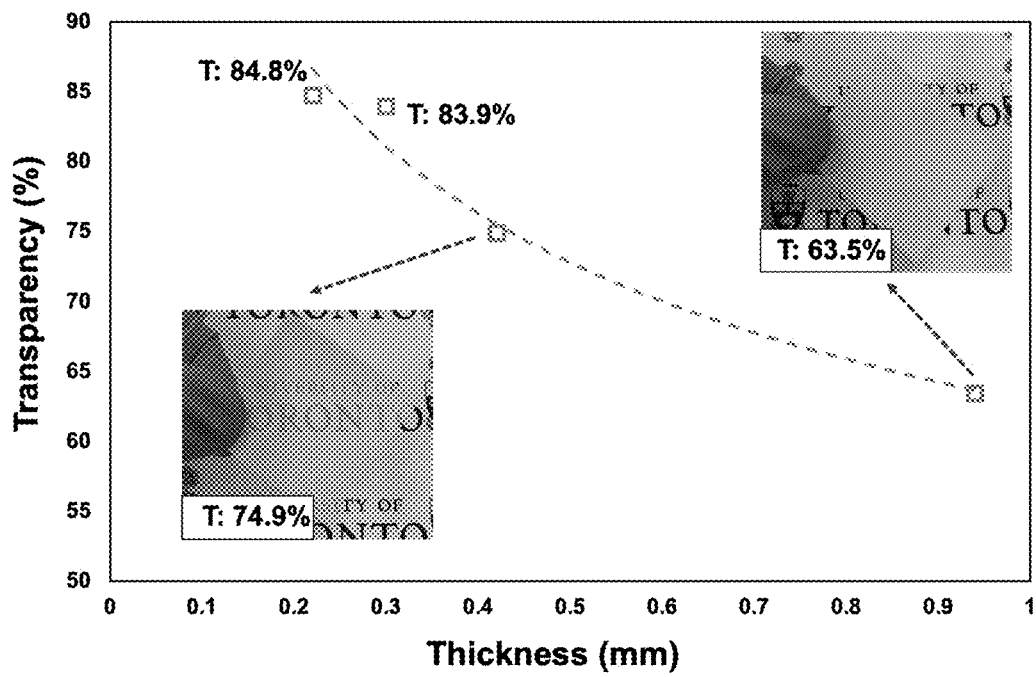
FIG. 8b is the plot of transparency (%) versus thickness (mm) of aerogels.

FIG. 8a shows a transparency comparison of PCPI aerogels with other reported aerogels, and FIG. 8b illustrates the effect of film thickness on the transparency of PCPI aerogels. PI aerogels with improved light transparency can be a promising alternative to currently available optical polymers (e.g., polycarbonate), which typically suffer from low service temperature and high density. However, only a few works in the literature have demonstrated the feasibility of achieving PI aerogels with improved transparency, and this topic is still insufficiently explored. To our knowledge, no prior studies have obtained PI aerogels with light transparency, comparable to silica-based aerogels, which typically display over 80% transparency. Consequently, there is a need for the development of PI aerogels with enhanced transparency using novel and facile strategies.

For selected PCPI aerogel films, light transparency was measured using a UV-Vis spectrophotometer by placing the samples over the integrating sphere transmittance port. Light transparency of aerogel films, along with their corresponding density, are demonstrated in FIG. 8a. As can be seen, transparency of up to 85% was obtained in this work, which was the highest value reported for organic PI aerogels so far. Although the developed aerogels in this work have a slightly higher density than cellulose-based aerogels transparency showed improvement. More importantly, optical transparency was comparable to reported inorganic silica-based aerogels. Nevertheless, we should emphasize that PCPI aerogels possess considerably better mechanical flexibility compared to silica-based counterparts, and therefore can be effectively used for practical applications.

The improved transparency of PCPI aerogel films in this work compared to reported PI aerogels can be due to the employment of a physical crosslinking strategy and the elimination of the crosslinking agent. Along with slightly different chemical compositions and molecular weight, all these resulted in enhanced transparency. Furthermore, a more uniform and smaller pore-size distribution could have also caused such high transparency. Another important factor that was rarely discussed in the literature is the aerogel film's thickness. This is of high importance from the application point of view, especially when thermal insulation performance is needed.

As presented in FIG. 8b, thickness has a considerable impact on the optical transparency of PI aerogel films. When the thickness was reduced from 0.95 to 0.22 mm, the transparency experienced a significant improvement, i.e., from 63.5 to 84.8%. Such a strong dependence of aerogel's transparency on its thickness has been also previously reported. In the case of crosslinked aerogels, it was argued that the presence of pores affects the light transparency (visibility) of aerogels, as their thickness varies. This phenomenon was further explored by Zhao et al. [28] using theoretical and experimental evaluations. Both theoretical (using the radiative transfer model) and experimental measurements of total transmittance and haze of transparent aerogels showed the importance of aerogel thickness. For various particle sizes, it was observed that in all cases, increasing thickness had a detrimental effect on optical transparency.

However, for aerogels with smaller particle sizes, such a dependency became minimal, and high transparency was maintained at various thicknesses. However, the facts behind the light transparency of aerogels are still not fully clear, and other sample parameters namely density, molecular weight, and chain packing ability may also play an active role, and further research needs to be conducted. Eventually, it should be noted that not all aerogels can be made into thin-film configurations with controlled thickness while maintaining their mechanical flexibility. For instance, silica aerogels due to their inherent brittleness do not have the capability to be transformed into thin-film aerogels without structural disintegration. Therefore, it can be argued that the physical crosslinking route introduced in this study can have great potential in the fabrication of thin-film aerogels (which are essential for conformable applications) with controlled thickness and tailored properties.

In an embodiment, the present disclosure provides a polyimide aerogel, comprising: a polyimide-based polymer of the formula 1:

Formula 1

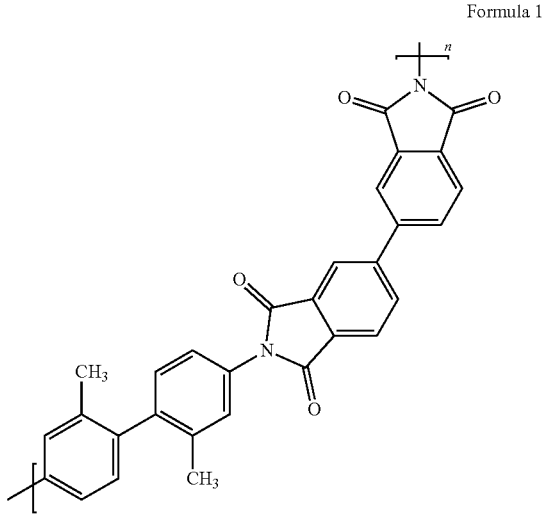

wherein n is an integer in a range between about 30 to about 50, and wherein the polymer is physically crosslinked through polymer chain entanglement.

In embodiments, the aerogel has a pore size in a range from about 2 nanometers to about 100 nanometers, or a pore size in a range from about 2 nanometers to about 50 nanometers, or the pore size is less than about 2 nanometers.

In embodiments, the aerogel has a porosity in a range from about 85% to about 99%, or the porosity is in a range from about 95% to about 99%.

In embodiments, the aerogel is free of chemical cross-linkers.

In embodiments, the aerogel has a density in a range from about 0.07 g/cm$^3$ to about 0.25 gm/cm$^3$.

In embodiments, the aerogel has a thermal conductivity in a range from about 15 to about 50 milliwatts/degrees Kelvin-meters.

In embodiments, the aerogel is characterized by a hydrophobicity in a range from about 90 degrees to 140 degrees water contact. angle.

In embodiments, the aerogel is characterized by a water uptake as low as about 1%.

In embodiments, the aerogel has an onset of thermal decomposition in a range from about 500 to 700° C.

In embodiments, the aerogel has a dielectric constant in a range from about 1.5 to 3.

In embodiments, the aerogel is in the form of a film having a thickness of at least about 80 microns.

In embodiments, the aerogel has an optical transparency in a range from about 60% to about 99%.

In embodiments, the aerogel is characterized by a compressive modulus in a range from about 17 to 25 Mega Pascal (MPa).

In embodiments, the aerogel is characterized by a tensile modulus in a range from about 1 to 5 Mega Pascal (MPa).

In embodiments there is provided a process of making a polyimide aerogel comprising the steps of:

forming a wet gel by reacting a diamine monomer (DIAM) with a dianhydride monomer (DIAH) in a reaction solution comprising a dipolar aprotic solvent to form the polymer of Formula A; wherein n is between the range of 30 to 50

Formula A

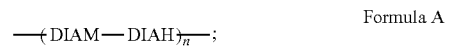

imidizing the formed polymer;

replacing the aprotic solvent with a drying solvent; and removing the drying solvent from the formed wet gel.

In embodiments of the process, other diamines and dianhydrides may work. However, the properties including the hydrophobicity and mechanical properties could be different ones as below, for example, non-limiting alternatives to DIAM include m-Phenylene diamine (m-PDA), p-Phenylene diamine (p-PDA), 4,4-Methylene dianiline (MDA) and 4,4'-Oxydianiline (ODA).

In embodiments, alternatives to DIAH include, but are not limited to, Pyromellitic dianhydride (PMDA), 2,2-Bis(3, 4dicarboxyphenyl)hexafluoropropane dianhydride (6FDA), 2,2-Bis[4-(3,4dicarboxyphenoxy)phenyl]propane-dianhydride (BPADA), Benzophenonetetracarboxylic dianhydride (BTDA), and 4,4'-Oxydiphthalic anhydride (ODPA).

In an embodiment, the step of imidizing the formed polymer is performed through thermal imidization or chemical imidization. Thermal imidization is not a usual imidization process for PI aerogels due to the fact that it needs a temperature of up to 300 degrees Celsius which may result in solvent evaporation and significant shrinkage. However, thermal imidization can be done either after super-critical drying when the solvent is already extracted, or by heating using a pressure vessel to avoid solvent evaporation, which is a more complicated process.

In an embodiment, the step of imidizing is performed via chemical imidization.

In an embodiment, the chemical imidization is done by adding a chemical dehydrating agent to the reaction solution.

In an embodiment, the chemical dehydrating agent may be a mixture of an alkanoic anhydride and an organic base. The alkanoic anhydrides may comprise acetic anhydride, propionic anhydride, benzoic anhydride, n-butyric anhydride, trifluoroacetic anhydride or any combination thereof. The organic base may comprise pyridines, mono-, di- and trialkyl amines, isoquinoline, piperazine, morpholine, piperidine, or any combination thereof.

In an embodiment, the chemical dehydrating agent is a mixture of acetic anhydride and pyridine.

In an embodiment, the process includes a step of quick gelation and aging the wet gel to increase the polymerization yield and to advance the degree of physical crosslinking. Physical crosslinking is done by physical entanglement of the formed polymer chains and can be described morphologically. However, with respect to the very small size of polymer chains, tens of nanometers, calculating the degree of physical crosslinking using image processing will be challenging. Yet, it is still possible to compare the properties of different physically crosslinked aerogels, such as mechanical, to compare their degree of crosslinking.

In an embodiment, the quick gelation occurs for a period of time ranging between 1 minute to 10 minutes.

In an embodiment, the aging of the wet gel is done for a period of time ranging between 90 minutes and 48 hours.

In an embodiment, the aprotic solvent is N-methylpyrrolidinone (NMP), dimethylformamide (DMF), dimethyl sulfoxide (DMSO), or a mixture of NMP and tetrahydrofuran (THF).

In an embodiment, the process includes a step of adding a chemical crosslinker to the reaction solution. Non-limiting examples of chemical crosslinkers include a triamine, an aliphatic amine comprising three or more amines, an aliphatic triamine, an aromatic amine comprising three or more amine groups, an aromatic triamine, 1,3,5-tri(aminophenoxy)benzene, a silica gel structure decorated with three or more amines.

In an embodiment, the step of reacting the DIAM monomer with the DIAH monomer is done without the use of a chemical crosslinker.

In an embodiment, the DIAM monomer and DIAH monomer are first dissolved separately then the DIAM monomer solution is combined with the DIAH monomer solution.

In an embodiment the DIAM monomer is first dissolved and the DIAH monomer is added to the DIAM solution.

In an embodiment, the aprotic solvent is N-methylpyrrolidinone (NMP).

In an embodiment, the diamine monomer (DIAM) is 2,2'-dimethylbenzidine (DMBZ).

In an embodiment, the dianhydride monomer (DIAH) is biphenyl-tetracarboxylic acid dianhydride (BPDA).

In an embodiment, the drying solvent is removed via supercritical drying, freeze drying, or ambient pressure drying.

In an embodiment, the drying solvent is a solvent that is soluble in liquid $CO_2$ and can be any one or combination of ethanol, acetone, toluene, tetrahydrofuran (THF), cyclohexane, or a combination thereof.

In an embodiment the drying solvent is removed via freeze drying and the drying solvent is water or alcohol.

In an embodiment, the drying solvent is removed via ambient drying.

In an embodiment, the drying solvent is an alcohol or acetone.

In an embodiment, the wet gel forming step occurs over a period of time ranging between 1 min to 24 h.

In an embodiment, the process further includes a step of pouring the reacting solution into a bulk monolithic mold or a thin film mold.

In an embodiment, the process further includes the step of adding an additive to the reaction solution. In an embodiment, the additive is a polymer stabilizer, a functionalizing agent, or a combination thereof, other polymers, other aerogels, carbon nanotubes, metallic fillers or particles, organic or inorganic fibers, organic or inorganic fillers or particles, or non-woven or woven fiber reinforcement composed of a carbon precursor fiber, a glass fiber, a polymeric organic fiber, a ceramic fiber, or a biopolymer fiber.

In an embodiment, the additive is selected from the group consisting of polymer, aerogel, carbon nanotubes, metallic fillers or particles, organic or inorganic fibers, organic or inorganic fillers or particles, non-woven or woven fiber reinforcement composed of a carbon precursor fiber, a glass fiber, a polymeric organic fiber, a ceramic fiber, a biopolymer fiber or any combination thereof.

CONCLUSIONS

PI aerogels as an important class of organic aerogels have drawn great attention in the past decade in both academia and industry. This is due to their outstanding mechanical, thermal, and chemical performance. Recently, many attempts have been is performed to tailor PI aerogels' properties mainly through changing monomers' compositions or altering chemical crosslinker type. One major shortcoming of PI aerogels, however, is the high cost and environmental impacts of chemical crosslinkers. In this study, for the first time, the present inventors have introduced the novel physical crosslinking route for PI aerogels synthesis by effectively controlling the process parameters including monomers dispersion time and reaction time. Compared to the chemically crosslinked PI aerogels, the fabricated physically crosslinked aerogels presented even higher porosity with the observed porosity ranging from 95.09% to 98.46%. Morphological characterization of PCPI aerogels showed that due to their longer monomers dissolving time and longer reaction time, physically entangled fibers with increased fiber aspect ratio and reduced fiber thickness were formed. Such a strong physically crosslinked network showed to have a noticeable impact on the mechanical properties of PCPI aerogels.

A compressive modulus of over 20 MPa was obtained, which was significantly larger than the reported one in state-of-the-art PI aerogels. Interestingly, PCPI aerogels displayed outstanding moisture resistance. When the samples were fully immersed in water, water uptake as low as 15% was achieved with a WCA of over 110°. Considering the fact that super hydrophilicity has been a longstanding shortcoming of PI aerogels, this work can pave the way toward the fabrication of moisture-resistant PI aerogels without sacrificing other properties. Investigation of the thermal and electrical properties of PCPI aerogels supported this phenomenon. As observed from TGA results, samples had excellent thermal stability with a decomposition temperature of about 530° C. Furthermore, the dielectric constant remained in the low range of 2.3-2.8, comparable to other low dielectric polymers.

The present method is very advantageous in that the chemical formulation is fabricated using industrially available monomers of polyimide at comparable prices to polyimide foams per unit of weight. However, with respect to about 5 to 10 times lower density of fabricated material compared to polymeric foams, the material cost is expected to be significantly lower per unit of volume. Moreover, unlike previously introduced polyimide aerogels, one novelty of the introduced material is in avoiding any chemical crosslinker, those are both very expensive, as high as $80/g, and are environmentally unfriendly materials. Except for the chemical backbone materials and the chemical reagents, the processing solvents including the liquid $CO_2$ of the drying process could be reused in a filtered circulation process. The fabrication process disclosed herein consists of simple solution mixing and casting with relatively quick gelation followed by $CO_2$ supercritical drying. Furthermore, relatively fast gelation and thin film geometry mean simple scale-up with respect to target application requirements.

Another advantage is that organic aerogels can be recycled via different methods including (i) pyrolysis (conversion of aerogels into oil and fuels through thermal degradation; (ii) solvent extraction (using aqueous or non-aqueous media for dissolving aerogels and recovering valuable components; and (iii) mechanical grinding (reusing aerogel powders in a series of consecutive procedures as absorbent for oil/chemical cleanup and insulation purposes.

REFERENCES

[1] M. A. B. Meador et al., "Polyimide aerogels with amide cross-links: a low cost alternative for mechanically strong polymer aerogels," *ACS Appl. Mater. Interfaces*, vol. 7, no. 2, pp. 1240-1249, 2015.

[2] H. Guo et al., "Polyimide aerogels cross-linked through amine functionalized polyoligomeric silsesquioxane," *ACS Appl. Mater. Interfaces*, vol. 3, no. 2, pp. 546-552, 2011.

[3] M. A. B. Meador et al., "Mechanically strong, flexible polyimide aerogels cross-linked with aromatic triamine," *ACS Appl. Mater. Interfaces*, vol. 4, no. 2, pp. 536-544, 2012.

[4] H. Guo et al., "Tailoring properties of cross-linked polyimide aerogels for better moisture resistance, flexibility, and strength," *ACS Appl. Mater. Interfaces*, vol. 4, no. 10, pp. 5422-5429, 2012.

[5] S. Ghaffari Mosanenzadeh, M. Alshrah, Z. Saadatnia, C. B. Park, and H. E. Naguib, "Double Dianhydride Backbone Polyimide Aerogels with Enhanced Thermal Insulation for High-Temperature Applications," *Macromol. Mater. Eng.*, vol. 305, no. 4, pp. 1-12, 2020, doi: 10.1002/mame.201900777.

[6] S. G. Mosanenzadeh, Z. Saadatnia, S. Karamikamkar, C. B. Park, and H. E. Naguib, "Polyimide aerogels with novel bimodal micro and nano porous structure assembly for airborne nano filtering applications," *RSC Adv.*, vol. 10, no. 39, pp. 22909-22920, 2020, doi: 10.1039/d0ra03907a.

[7] M. A. B. Meador, M. Agnello, L. McCorkle, S. L. Vivod, and N. Wilmoth, "Moisture-resistant polyimide aerogels containing propylene oxide links in the backbone," *ACS Appl. Mater. Interfaces*, vol. 8, no. 42, pp. 29073-29079, 2016.

[8] B. N. Nguyen, M. A. B. Meador, D. Scheiman, and L. McCorkle, "Polyimide aerogels using triisocyanate as cross-linker," *ACS Appl. Mater. Interfaces*, vol. 9, no. 32, pp. 27313-27321, 2017.

[9] W. Rhine, J. Wang, and R. Begag, "Polyimide aerogels, carbon aerogels, and metal carbide aerogels and methods of making same." Google Patents, Jul. 11, 2006.

[10] S. G. Mosanenzadeh, S. Karamikamkar, Z. Saadatnia, C. B. Park, and H. E. Naguib, "PPDA-PMDA polyimide aerogels with tailored nanostructure assembly for air filtering applications," *Sep. Purif. Technol.*, vol. 250, p. 117279, 2020.

[11] O. A. Tafreshi et al., "Novel, Flexible, and Transparent Thin Film Polyimide Aerogels with Enhanced Thermal Insulation and High Service Temperature," *J. Mater. Chem. C*, 2022.

[12] W. Chen, H. Yu, Q. Li, Y. Liu, and J. Li, "Ultralight and highly flexible aerogels with long cellulose I nanofibers," *Soft Matter*, vol. 7, no. 21, pp. 10360-10368, 2011.

[13] H. Guo, M. A. B. Meador, L. S. McCorkle, D. A. Scheiman, J. D. McCrone, and B. Wilkewitz, "Poly (maleic anhydride) cross-linked polyimide aerogels: synthesis and properties," *RSC Adv.*, vol. 6, no. 31, pp. 26055-26065, 2016, doi: 10.1039/C6RA01013J.

[14] S. Wu, A. Du, S. Huang, W. Sun, Y. Xiang, and B. Zhou, "Solution-processable polyimide aerogels with high hydrophobicity," *Mater. Lett.*, vol. 176, pp. 118-121, 2016.

[15] S. Qiao, S. Kang, Z. Hu, J. Yu, Y. Wang, and J. Zhu, "Moisture-resistance, mechanical and thermal properties of polyimide aerogels," *J. Porous Mater.*, vol. 27, no. 1, pp. 237-247, 2020.

[16] H. Guo et al., "Flexible Polyimide Aerogels with Dodecane Links in the Backbone Structure," *ACS Appl. Mater. Interfaces*, vol. 12, no. 29, pp. 33288-33296, 2020.

[17] J. P. de Oliveira, G. P. Bruni, S. L. M. El Halal, F. C. Bertoldi, A. R. G. Dias, and E. da Rosa Zavareze, "Cellulose nanocrystals from rice and oat husks and their application in aerogels for food packaging," *Int. J. Biol. Macromol.*, vol. 124, pp. 175-184, 2019.

[18] J.-H. Kim, H.-R. Kim, H.-H. Park, and S.-H. Hyun, "Aging effect of SiO2 xerogel film on its microstructure and dielectric properties," *Appl. Surf. Sci.*, vol. 169, pp. 452-456, 2001.

[19] J.-K. Hong, H.-S. Yang, M.-H. Jo, H.-H. Park, and S.-Y. Choi, "Preparation and characterization of porous silica xerogel film for low dielectric application," *Thin Solid Films*, vol. 308, pp. 495-500, 1997.

[20] C. Wang, W. Chen, C. Xu, X. Zhao, and J. Li, "Fluorinated polyimide/POSS hybrid polymers with high solubility and low dielectric constant," Chinese *J. Polym. Sci.*, vol. 34, no. 11, pp. 1363-1372, 2016.

[21] S. G. Mosanenzadeh, Z. Saadatnia, F. Shi, C. B. Park, and H. E. Naguib, "Structure to properties relations of BPDA and PMDA backbone hybrid diamine polyimide aerogels," *Polymer (Guildf)*, vol. 176, no. February, pp. 213-226, 2019, doi: 10.1016/j.polymer.2019.05.050.

[22] S. G. Mosanenzadeh, Z. Saadatnia, F. Shi, C. B. Park, and H. E. Naguib, "Structure to properties relations of BPDA and PMDA backbone hybrid diamine polyimide aerogels," *Polymer (Guildf)*, vol. 176, pp. 213-226, 2019.

[23] P. Gupta, B. Singh, A. K. Agrawal, and P. K. Maji, "Low density and high strength nanofibrillated cellulose aerogel for thermal insulation application," *Mater. Des.*, vol. 158, pp. 224-236, 2018.

[24] C. Gong, J. Ni, C. Tian, and Z. Su, "Research in porous structure of cellulose aerogel made from cellulose nanofibrils," *Int. J. Biol. Macromol.*, vol. 172, pp. 573-579, 2021.

[25] H. Liu et al., "Enhanced thermal shrinkage behavior of phenolic-derived carbon aerogel-reinforced by HNTs with superior compressive strength performance," *Ceram. Int.*, vol. 47, no. 5, pp. 6487-6495, 2021.

[26] Z. Yang, H. Yu, X. Li, H. Ding, and H. Ji, "Hyperelastic and hydrophobic silica aerogels with enhanced compressive strength by using VTES/MTMS as precursors," *J. Non. Cryst. Solids*, vol. 525, p. 119677, 2019.

[27] H. Yang, X. Kong, Y. Zhang, C. Wu, and E. Cao, "Mechanical properties of polymer-modified silica aerogels dried under ambient pressure," *J. Non. Cryst. Solids*, vol. 357, no. 19-20, pp. 3447-3453, 2011.

[28] L. Zhao et al., "Theoretical and experimental investigation of haze in transparent aerogels," *Opt. Express*, vol. 27, no. 4, pp. A39-A50, 2019.

Therefore what is claimed is:

1. A polyimide aerogel, comprising:
a polyimide-based polymer of the formula 1:

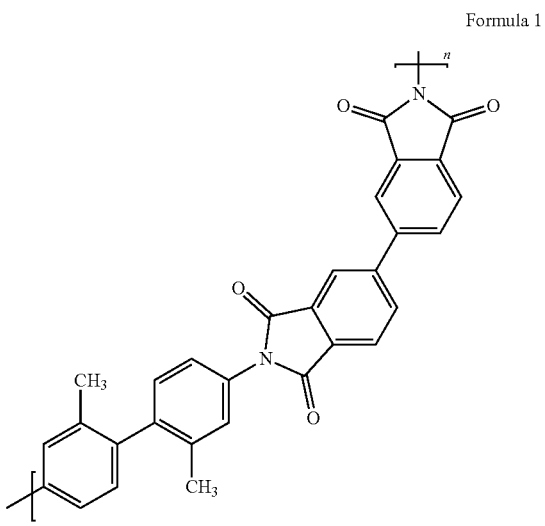

Formula 1 wherein n is an integer in a range between about 30 to about 50, and
wherein the polymer is physically crosslinked through polymer chain entanglement, and the aerogel is formed by a process including initial gelation for about 1-10 minutes; and
wherein the aerogel is free of polyamic amide polymer.

2. The polyimide aerogel according to claim 1, wherein the aerogel has a pore size in a range from about 2 nanometers to about 100 nanometers.

3. The polyimide aerogel according to claim 1, wherein the aerogel has pores with a pore size of less than about 2 nanometers.

4. The polyimide aerogel according to claim 1, wherein the aerogel has a porosity in a range from about 85% to about 99%.

5. The polyimide aerogel according to claim 1 is free of chemical crosslinkers.

6. The polyimide aerogel according to claim 1, wherein the aerogel has a density in a range from about 0.07 g/cm³ to about 0.25 g/cm³.

7. The polyimide aerogel according to claim 1, wherein the aerogel has a thermal conductivity in a range from about 15 to about 50 milliwatts/degrees Kelvin-meters.

8. The polyimide aerogel according to claim 1, wherein the aerogel is characterized by a hydrophobicity in a range from about 90 degrees to about 140 degrees water contact angle.

9. The polyimide aerogel according to claim 1, wherein the aerogel is characterized by a water uptake as low as about 1%.

10. The polyimide aerogel according to claim 1, wherein the aerogel has an onset of thermal decomposition in a range from about 500 to about 700° C.

11. The polyimide aerogel according to claim 1, wherein the aerogel has a dielectric constant in a range from about 1.5 to about 3.

12. The polyimide aerogel according to claim 1, wherein the aerogel is in the form of a film having a thickness of at least about 80 microns, and wherein the aerogel has optical transparency in a range from about 60% to about 99%.

13. The polyimide aerogel according to claim 1, wherein the aerogel is characterized by a compressive modulus in a range from about 17 to 25 Mega Pascal (MPa).

14. The polyimide aerogel according to claim 1, wherein the aerogel is characterized by a tensile modulus in a range from about 1 to 5 Mega Pascal (MPa).

15. A process of making a polyimide aerogel of claim 1, comprising the steps of
forming a wet gel by reacting a diamine monomer (DIAM) with a dianhydride monomer (DIAH) in a reaction solution comprising a dipolar aprotic solvent to form the polymer of Formula A; wherein n is between the range of 30 to 50

$$-(\text{DIAM}-\text{DIAH})_{\overline{n}}-;$$ Formula A imidizing the formed polymer;
gelation of the formed polymer for about 1-10 minutes;
replacing the aprotic solvent with a drying solvent; and
removing the drying solvent from the formed wet gel.

16. The process of claim 15, wherein the step of imidizing the formed polymer is performed through thermal imidization or chemical imidization.

17. The process of claim 15, further comprising the step of aging the wet gel obtained by the initial gelation to increase the polymerization yield and to advance the degree of physical crosslinking.

18. The process of claim 15, wherein the aprotic solvent is N-methylpyrrolidinone (NMP), dimethylformamide (DMF), dimethyl sulfoxide (DMSO), or a mixture of NMP and tetrahydrofuran (THF).

19. The process of claim 15, wherein the step of reacting the DIAM monomer with the DIAH monomer is done without the use of a chemical crosslinker.

20. The process of claim 15, wherein the DIAM monomer and DIAH monomer are first dissolved separately then the DIAM monomer solution is combined with the DIAH monomer solution.

21. The process of claim 15, wherein DIAM monomer is first dissolved and DIAH monomer is added to the DIAM solution.

22. The process of claim 15, wherein the diamine monomer (DIAM) is 2,2'-dimethylbenzidine (DMBZ).

23. The process of claim 15, wherein the dianhydride monomer (DIAH) is biphenyl-tetracarboxylic acid dianhydride (BPDA).

24. The process of claim 15, wherein the drying solvent is removed via supercritical drying, freeze drying, or ambient pressure drying.

25. The process of claim 15, wherein the wet gel forming step occurs over a period of time ranging between about 1 minute to about 24 hours.

\* \* \* \* \*